(12) United States Patent
Rapowitz et al.

(10) Patent No.: US 12,216,640 B2
(45) Date of Patent: Feb. 4, 2025

(54) DISPLAYING VISUAL INDICATIONS OF FILES BEING VIEWED VIA AN AUGMENTED REALITY HEADSET

(71) Applicant: Capital One Services, LLC, McLean, VA (US)

(72) Inventors: Samuel Rapowitz, Roswell, GA (US); John Jones, Alexandria, VA (US); Michael Gaba, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 136 days.

(21) Appl. No.: 18/163,234

(22) Filed: Feb. 1, 2023

(65) Prior Publication Data

US 2024/0256520 A1  Aug. 1, 2024

(51) Int. Cl.
*G06F 16/23* (2019.01)
*G06F 16/16* (2019.01)

(52) U.S. Cl.
CPC ........ *G06F 16/2365* (2019.01); *G06F 16/168* (2019.01)

(58) Field of Classification Search
CPC .................. G06F 16/2365; G06F 16/168
See application file for complete search history.

(56) References Cited

U.S. PATENT DOCUMENTS

| | | | |
|---|---|---|---|
| 2018/0348989 A1* | 12/2018 | Smyth ................. | G06F 3/04817 706/25 |
| 2021/0192813 A1* | 6/2021 | Deibler .................. | G06F 3/017 706/25 |
| 2022/0318484 A1* | 10/2022 | Keslin ................... | G06F 3/0484 706/25 |
| 2022/0358238 A1* | 11/2022 | Bag ....................... | G06V 30/414 706/25 |
| 2023/0134989 A1* | 5/2023 | Hron, II ................ | G06F 16/906 706/12 |
| 2023/0186071 A1* | 6/2023 | Rice ....................... | G06N 20/00 706/25 |
| 2024/0217257 A1* | 7/2024 | Wells ..................... | G06V 20/95 706/25 |
| 2024/0256520 A1* | 8/2024 | Rapowitz ............. | G06F 16/2365 706/25 |

* cited by examiner

*Primary Examiner* — Yuk Ting Choi
(74) *Attorney, Agent, or Firm* — FOLEY & LARDNER LLP

(57) ABSTRACT

Displaying visual indications of one or more files that are associated with a file being viewed via an augmented reality headset may be facilitated. In some embodiments, an image of a file being viewed by a user may be received. The system may determine whether a file is associated with a first error indicating an inconsistency between the file and one or more other files related to the file. Based on determining that the file is associated with the first error, the system may retrieve, based on one or more file identifiers corresponding to the one or more other files, one or more other files associated with the inconsistency. The system may then generate for display (i) a visual indicator indicating the first error and (ii) one or more visual indications of the one or more other files associated with the inconsistency.

20 Claims, 9 Drawing Sheets

DISPLAYING VISUAL INDICATIONS OF FILES BEING VIEWED VIA AN AUGMENTED REALITY HEADSET

BACKGROUND

In recent years, display technology has evolved past simple two-dimensional displays to various virtual reality and augmented reality displays enabling three-dimensional and other features. There are various applications for these types of displays. For example, virtual reality displays enable users to view three-dimensional worlds while augmented reality displays enable users to see real world objects within three-dimensional worlds and vice versa. An advantage of these types of displays is that they allow a user to see more than just a current document or file. Accordingly, these displays may be useful in detecting inconsistencies and/or errors within related sets of files or documents. For example, when a user is reviewing a file or documents of a set of related files or documents, the user may not be able to readily notice an inconsistency or an error because it may require comparing multiple files or multiple documents. Even if an error or an inconsistency is located using a computing device, it may be difficult or inconvenient for a user to notice the error or the inconsistency. Thus, using virtual reality and/or augmented reality displays may enable flagging these errors to the user while a user is reviewing a file or a document.

SUMMARY

Methods and systems are described herein for novel uses and/or improvements to error identification and/or inconsistency identification applications. As one example, methods and systems are described herein for displaying visual indications of one or more files that are associated with a file that includes an error or an inconsistency as related to other files within a file package, via an augmented reality headset, to quickly and efficiently identify and resolve the error.

In some embodiments a detection system may (i) determine, via a machine learning model trained to identify inconsistencies within files, whether a file being viewed by a user in an augmented reality environment includes an error and (ii) generate a visual indication indicating the error and one or more files related to the error. As an example, a software developer (or another user) may wear an augmented reality headset when reviewing a runtime log during code development of a software application. Runtime logs may be useful to review during software development as such runtime logs may display relevant information such as when functions or methods are called, output values of functions/methods, and other information. However, as software applications continue to increase in complexity, errors or other inconsistencies presented within the runtime log may not be easily identifiable. Although the runtime log may indicate various outputs associated with a given input of a function/method (e.g., from a test case file), the results may be presented for a very short period of time as the software is executed, thereby making it difficult for a software developer to see where any errors, inconsistencies, or other failures exist. For instance, a software developer may create a test case file including multiple functions or methods to be tested, as well as a provided input. Although test case files may enable an indication in a runtime log to be presented as to whether an expected output from a given input is deemed to be correct, using such outdated methodologies may overwhelm the user with a large number of results to parse through. Such results are often in black and white text and may cause a user to overlook or skip over a potential error. Furthermore, reviewing runtime logs may not be as straight forward as in the past. For instance, as the complexity of software applications increases, a single function may interact with multiple code libraries or other files, making narrowing down the potential error difficult and time-consuming. Using a machine learning model to determine errors or inconsistencies within a given file (e.g., a runtime log) with respect to other related files (e.g., test case files, code files, code libraries, etc.), the system may provide a user with additional information (such as the other related files) to quickly resolve the error. For example, the system may generate a visual indication in an augmented reality environment of the files (e.g., displaying the files in the augmented reality environment) that are related to the error to alert the user of the error or inconsistency. As another example, the system may generate a visual indication, such as a highlighting or geometric shape encompassing a portion of the file or a related file that is associated with the determined error or inconsistency. Accordingly, the user is provided with additional information to quickly diagnose and resolve the issue or the inconsistency at hand in an augmented reality environment, thereby reducing the amount of time needed to review the file package.

In some embodiments, a detection system may retrieve a data structure including (i) at least one portion of the file and (ii) one or more other portions of respective files of the one or more other files, where the at least one portion of the file is linked to the one or other portions of the respective files of the one or more other files. For example, to aid a software developer's review of a runtime log, the system may retrieve a data structure linking a portion of the runtime log that is associated with an error to another portion of a code file that is associated with the error. The data structure may be generated based on a machine learning model determining whether a portion of the runtime log is associated with an error (e.g., a given line of the runtime log indicating an error) with respect to portions of the other files (e.g., a test case file, a code file, a code library, etc.) that are associated with the error, which may then be used to link the determined errors together. The detection system may then generate a visual indication of the portion of the runtime log that includes the error (e.g., a highlighting, geometric shape, or other visual indication to alert the user) and a visual indication of the portion(s) of the other files that are associated with the error to aid the user in diagnosing and quickly identifying the cause of the error or inconsistency in the runtime log. For example, where multiple related files are involved with a detected error or an inconsistency in the runtime log, the detection system may present a series of links that link a portion of the runtime log associated with the detected error to other portions of each respective related file, thereby visually indicating each portion of each file that is associated with the error or inconsistency. In this way, the system may improve the user experience as the user (e.g., the software developer) may easily review and track down the source of each error when multiple files are associated with the error or inconsistency.

In some embodiments, a detection system may monitor the eyes of a user to generate an updated visual indication of the one or more other files to enable the user to select another file (e.g., a file related to the detected error) for further review. For example, using one or more eye-tracking sensors of an augmented reality headset, the system may determine whether the user is fixating on a portion of a file (e.g., a runtime log) that is associated with the error. The system may then display a visual indicator indicating the error, such as a highlighting of the error over the portion of the runtime log that is associated with the error. Additionally, the system may also display a visual indication of one or more other files, such as a test case file or code file that is part of a library, that is associated with the error of the runtime log in a stacked presentation. In this way, the user may be alerted of the files that are related to the error presented in the runtime log without obscuring the view of the runtime log. However, the user may want to perform a more in depth analysis of the cause of the error. As such, the system may determine, using the eye-tracking sensors of the augmented reality headset, whether the user is fixating on one or more of the visual indications of the related files for an amount of time. If the amount of time satisfies a threshold time period, the system may generate for display, an updated visual indication of each of the related files in an enlarged view to enable a user selection of one or more of the related files. For example, the enlarged view may visually enlarge each of the related files (e.g., the test case file and the code file that is part of a code library) to enable the user to see the cause of an error or other inconsistency. The system may then determine, based on gesture recognition, whether a user selects a visual indication of a related file. For instance, the user may point to a visual indication of a test case file in the augmented reality environment, which may cause a visual indication of an error (e.g., a highlighting of the error associated with the test case file) that is linked to the error visually indicated in the runtime file. In this way, the user experience is improved by enabling the user to easily determine the root cause of an error presented in the runtime file.

In some aspects, systems and methods for displaying visual indications of one or more files that are associated with a file being viewed via an augmented reality headset are provided. For example, the system may receive an image of a file being viewed by a user. The system may determine whether the file is associated with a first error indicating an inconsistency between the file and one or more other files related to the file. For example, the inconsistency may be identified using a machine learning model trained to identify inconsistencies within files. The system may then determine one or more file identifiers corresponding to the one or more other files. Based on determining that the file is associated with the first error, the system may retrieve, based on the one or more file identifiers corresponding to the one or more other files, the one or more other files associated with the inconsistency. The system may then generate for display, on one or more augmented reality displays, (i) a visual indicator indicating the first error and (ii) one or more visual indications of the one or more other files associated with the inconsistency.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
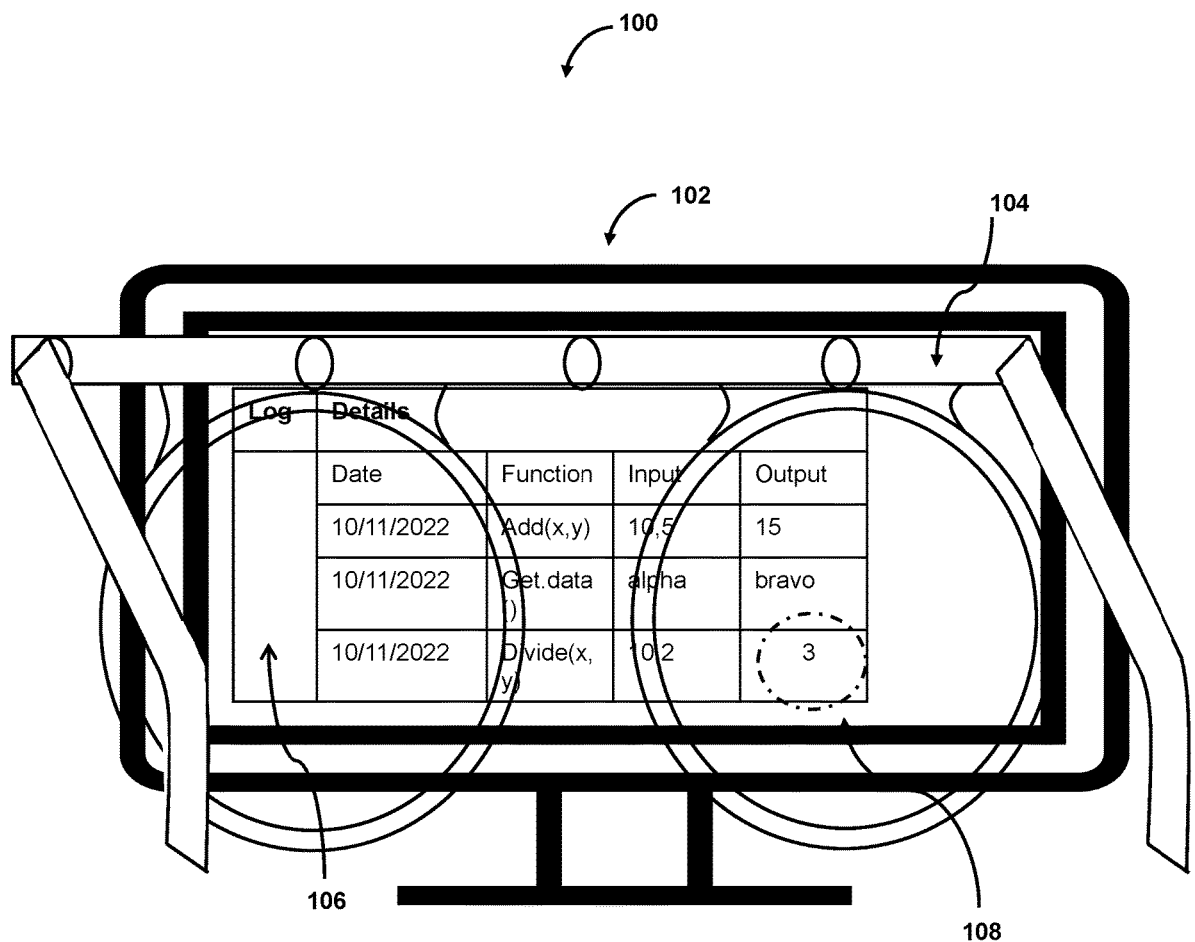
FIG. 1 shows an illustrative presentation of visual indications indicating errors associated with a file, in accordance with one or more embodiments.

FIG. 1 shows an illustrative presentation of visual indications indicating errors associated with a file, in accordance with one or more embodiments. System 100 may include a file viewing display 102, such as a computer monitor, a wearable device 104, a file 106 and a visual indication 108 indicating an error associated with a file. For example, FIG. 1 may illustrate a user-perspective view of a presentation of visual indications of errors associated with a file, in accordance with one or more embodiments. For instance, a user may be viewing a runtime log when developing a software application. During software development, the runtime log may include information related to software development such as one or more notifications, messages, warnings, errors, inconsistencies, or other information that a software developer may need to be aware of when developing a software application. However, given the sheer amount of runtime messages that may be returned when the developer is developing the software application, errors included in the runtime log may be overlooked or otherwise missed by the software developer. Moreover, due to the generic nature of runtime logs, errors related to developing the software application may be misidentified or otherwise hidden as there are no visual indications to lead the software developer to notice an error or inconsistency of one or more functions or methods being tested. Due to these issues associated with runtime log files and existing logging software, the software developer may miss these errors, which may increase the software application development time, increase the amount of wasted computer processing and memory resources, and decrease the user experience when developing a software application. By presenting visual indications of errors to a user (e.g., a software developer), the user may quickly identify a source of an error associated with a file, thereby improving the user experience, decreasing the amount of wasted computer processing and memory resources, and decreasing the amount of time to develop the software application.

In some embodiments, file viewing display 102 may not be included. For example, a user may be viewing a physical file (or another type of document) which may include one or more errors or inconsistencies associated with the file. In such a case, the user may nonetheless be presented with visual indications of errors associated with the file via wearable device 104. For example, the user may be viewing test results that are on printed material (e.g., a paper copy printout of a test results file). For instance, test results may be a printout from a runtime log indicating various input values and output values of computer functions or methods tested during software development. As such, when the user is viewing the file, the wearable device 104 may generate for display, visual indications (e.g., visual indication 108) that visually indicate to the user that one or more portions of the file are associated with an error. In this way, the system may present visual indications of errors associated with physical documents as opposed to electronic documents (or other electronic files), thereby improving the user experience by expanding the use of the system to other mediums of documents.

Although software development is one example where this system can be used, other examples of where this system can be used may be financial document review (e.g., loan underwriting, credit report review, accounting, auditing, etc.), legal document review (e.g., case review, appeal review, case studies, etc.), or other document review purposes. For example, with respect to loan underwriting, a loan underwriter may be reviewing a mortgage application for an applicant. The mortgage application may be associated with a plethora of related financial documents such as W-2's, bank statements, assets, credit reports, pay stubs, or other financial documents. The mortgage application may have various fields or portions that are ultimately related to or depend on the related financial documents (e.g., supporting documentation). As the loan applicant typically fills out the mortgage application, it is the duty of the loan underwriter to ensure that the mortgage application is filled out correctly to perform a risk assessment of the loan requested. As underwriters process a large amount of loan applications in a given week, underwriters must work fast and efficiently to meet closing deadlines. This presents an inherent problem as loan underwriters may miss inconsistencies between the loan application (e.g., mortgage application) and the supporting documents. As such, existing systems do not have a mechanism to quickly alert loan underwriters of errors or other inconsistencies that exist within the loan application and the supporting financial documents. Therefore, by using the detection system described herein, loan underwriters may experience an improved user experience by having visual indications of errors associated with a file (e.g., a loan application) presented within an augmented reality environment to enable easy, quick, and accurate identification of errors and other inconsistencies present within loan applications.

The system may be used to quickly identify errors associated with a file. In disclosed embodiments, an error may include a condition or state of being incorrect. In some embodiments, an error may comprise inconsistencies between one or more files or one or more documents. In some embodiments, an error may be an inconsistency within a file as related to other files. For example, a file may indicate first information and the file may also indicate second information, where, the first information and the second information should be corresponding information (e.g., contextually identical information, matching information, similar information, or otherwise the same information), however, the first information and second information do not correspond to each other. For example, a loan application may have a name field at the top of the document identifying an applicant, and a name field at the bottom of the document identifying the applicant for signature. An error may be present where the names of the applicant differ between the top and bottom of the document. As another example, a loan application may have multiple asset fields (e.g., indicating a value or other amount associated with an asset the applicant owns) and a total asset field (e.g., the total value or other amount associated with all the assets the applicant owns). An error may be present where the total amount of assets do not add up to be the same amount of all the individual assets added up. In some embodiments, an error may be an inconsistency within one or more portions of a file. For example, a first portion of the file may indicate first information and second portion of the file may indicate second information, where, the first information and the second information should be corresponding information, however, the first information and second information do not correspond to each other. In some embodiments, an error may be an inconsistency between one file and one or more second files. For example, a first file may indicate first information and a second file may indicate second information, where, the first information and the second information should be corresponding information, however the first information and the second information are not corresponding information. For example, in the context of financial document review, an error may be a non-matching value between a loan application indicating a user's income and a W-2 supporting the loan application. As another example, in the context of financial document review, an error may be a misrepresentation of an income field on a loan application and a combination of multiple pay stubs adding up together. That is, the pay stub amounts when added together may not be the same as the net income value indicated on the loan application. In some embodiments, an error may be an inconsistency between a portion of a first file and a portion(s) of one or more second files. For example, a first portion of a first file may indicate first information and a second portion of a second file may indicate second information, where, the first information and the second information should be corresponding information, however the first information and the second information are not corresponding information.

In disclosed embodiments, a file may include any resource or medium configured for recording information. In some embodiments, a file may comprise a computer-readable file. For example, a computer-readable file may include a text file, an image, a PDF document, a Microsoft Word® document, a Microsoft PowerPoint® presentation, a Microsoft Excel® spreadsheet, a runtime file, a source code file, a test case file, a code library file, or other computer-readable file. In some embodiments, the file may comprise a physical file. For example, a physical file may include any physical documents such as a paper-based document, file, contract, loan application, credit report, paystub, W-2, asset list, banking document, industry performance document, debt statement, book, or other physical file/document.

The system may use related files. In disclosed embodiments, related files may be files that are associated with one another. In some embodiments, related files may be files that are within a file package. For example, a file package may include a set of files that share one or more characteristics with one another. For instance, a runtime file may be related to one or more code files, logic files, test case files, library files or other files. As another example, a loan application may be related to one or more supporting documents such as income statements, debt statements, industry performance documents, bank statements, W-2's, tax documents, social security numbers, certificates of housing, asset documents, pay stubs, or other documents related to a loan application. In some embodiments, related files may be files that are submitted (or provided) as input to a machine learning model to determine one or more errors or other inconsistencies that are present within the files. In some embodiments, related files may be a set of files that are otherwise relevant to one another by one or more characteristics, information included within the files, or otherwise related to one another.

The system may be used to link one or more files together. In disclosed embodiments, linking or linked files may be files (or other documents) that are associated with one another based on information included in the one or more files. For example, linking may be referred to as associating information of one file to information of another file. For example, a link may be an association between a first file and a second file based on contextual information shared between the first file and the second file, a portion of the first file and a portion of the second file, or other information between files. As such, a link may represent a "bond" or other association between information of two or more files. In some embodiments, a link may represent a bond or other association between portions of information in a single file. In some embodiments, linking one portion of a file to another portion of another file (or the same file) may be based on natural language processing (NLP) data of the portion to the other portion. In some embodiments, upon providing a file and one or more other files that are related to the file to a machine learning model to identify one or more inconsistencies or other errors, the identified errors or inconsistencies may be linked to one another via a data structure. For example, where a first file includes a first portion of information that is inconsistent with a second portion of information of a second file, the first portion and the second portion may be "linked" together. In some embodiments, the links may be used to generate one or more visual indicators of linked portions or linked files to indicate to a user where an error or other inconsistency exists with respect to other files. For instance, a visual indicator indicating a link (e.g., a line, an arrow, a highlighting, a geometric shape, a numeral, etc.) between portions of files may be generated based on the determined links to notify a user of which portion(s) of a file/files include an inconsistency or other error. In some embodiments, the links may link one portion of a first file to another portion of the first file (e.g., linking portions of a single file together). In this way, the links may not only be between one or more portions of differing files, but may be within the same file.

The system may be used to provide visual indications of errors and other files associated with errors that are associated with the file. In disclosed embodiments, a visual indication of an error may include any visual stimuli that is presented in association with an error. In some embodiments, a visual indication of an error may comprise a highlighting of the error, a geometric shape encasing an error, a color-coded shape encasing an error, a numerical or alphanumerical indicator associated with the error, an underlining of the error, a color-coded underlining of the error, a line (e.g., dotted line, hashed line, solid line, or other line), or other visual/graphical indicator. In disclosed embodiments, a visual indication of other file(s) associated with the error may include any visual stimuli that is presented in association with the error that is representative of the other file(s). In some embodiments, the visual indication of the other file(s) associated with the error (or other inconsistencies) may be a visual representation of the other file, a scaled visual representation of the other file (e.g., a 25% scaled presentation size of the file, a 30% scaled presentation size of the file, etc.), a stacked visual representation of the other file(s) (e.g., where the other files are presented as being visually stacked upon one another), a fan out visual representation of the other file(s) (e.g., where the other files are presented as being fanned out with respect to one another), a linked visual representation of the other file(s) (e.g., where the other files are connected by one or more links, such as a chain), a portion-linked visual representation of the other file(s) (e.g., where a portion(s) of a first file of the other files are linked to other portion(s) of other files), or other visual representation of the other file(s) that are associated with the error. In some embodiments, the visual representation of the other file(s) may be user-selectable to enable a user to select another file of the other files to view information included therein.

Figure 2A:
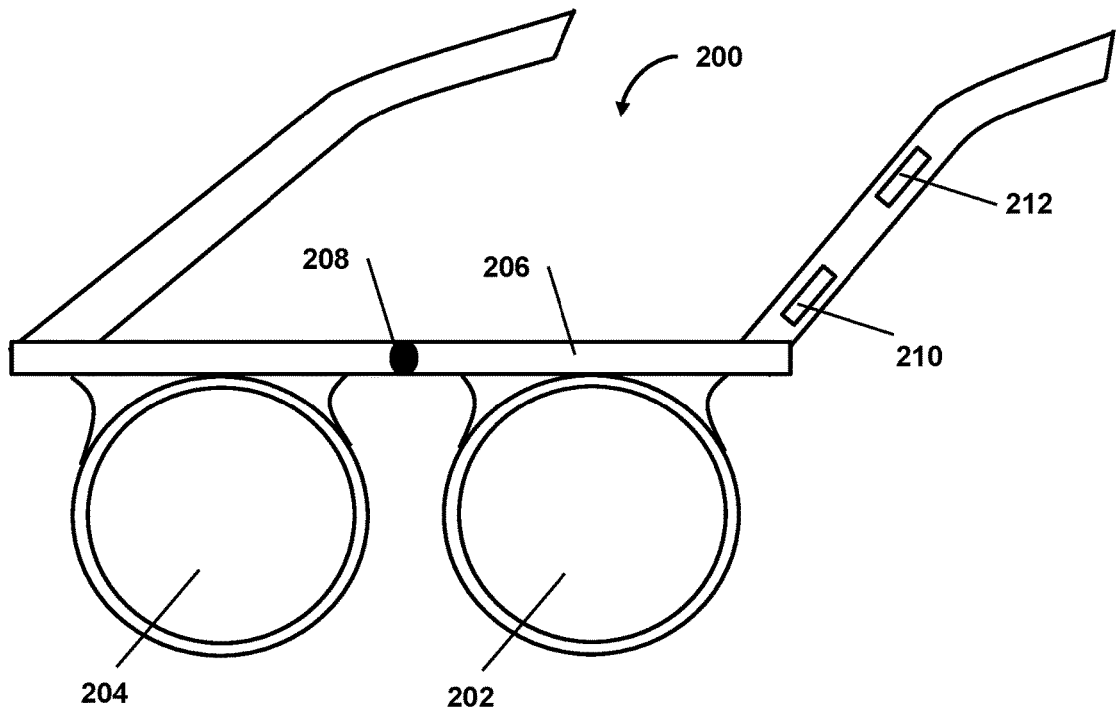
FIGS. 2A-2B show an illustrative diagram of a wearable device, in accordance with one or more embodiments.
Figure 2B:
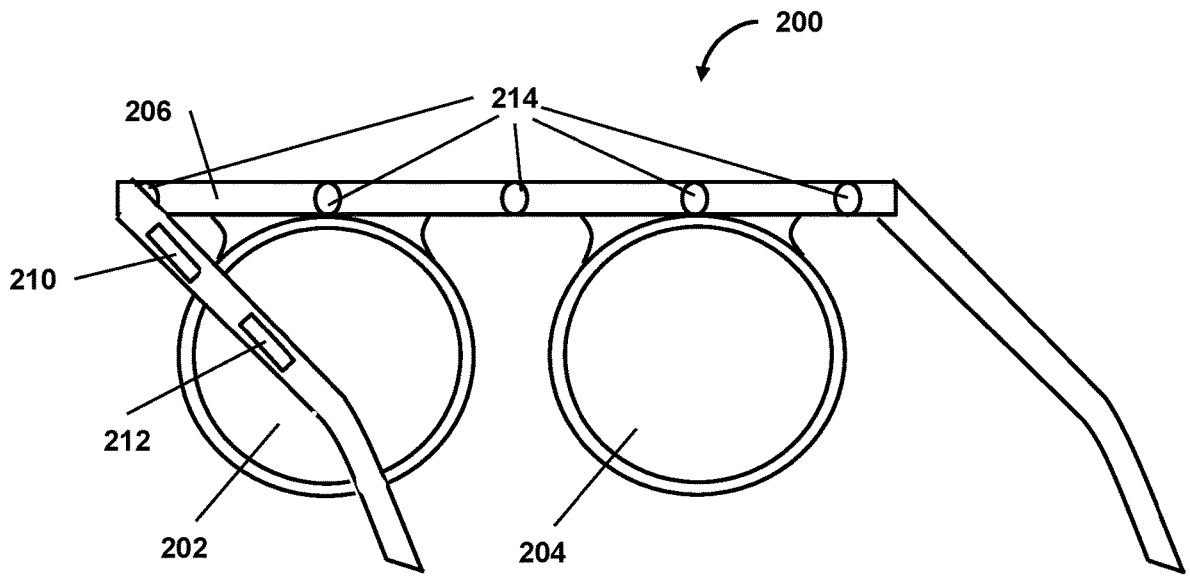

FIGS. 2A-2B show an illustrative diagram of a wearable device, in accordance with one or more embodiments. A wearable device may include any wearable device, such as, but not limited to, an augmented reality headset, a virtual reality headset, eyewear, glasses, sunglasses, or other wearable device configured to present visual indications of errors associated with a file, and visual indications of other files associated with the error (or other inconsistencies within a file). A wearable device may include one or more displays or lenses. In some embodiments, with respect to FIG. 1, wearable device 104 may include a wearable device 200. With respect to FIG. 2A, the wearable device 200 includes a left display 202 and a right display 204. Each display 202 and 204 may contain or be associated with a digital monitor configured to display (e.g., provide on a screen/lens or project onto an eye) images or other stimuli (e.g., visual indications) to the eyes of a user. In various embodiments, digital monitors may include displays, display screens, projectors, or other components to generate the image display on the display screen or project images onto an eye (e.g., a retina of the eye). It will be appreciated that digital monitors comprising projectors may be positioned at other locations to project images onto an eye of the subject or onto an eyepiece comprising a screen, glass, or other surface onto which images may be projected. In one embodiment, the left display 202 and right display 204 may be positioned with respect to the housing 206 to fit an orbital area on the user, and as such, each display 202, 204 is able to collect data and display/project image data, which in a further example includes displaying/projecting image data to a different eye.

The housing 206 may further include one or more outward facing sensors, which may be outward directed sensors 208 comprising one or more sensors such as image sensors, cameras, infrared sensors, gesture recognition sensors, or other sensors. In other embodiments, fewer or additional outward directed sensors 208 may be provided. The outward directed sensors 208 may be configured to capture continuous images of an environment of the user, documents being viewed by the user, files being viewed by the user, capture gestures of a user, or capture other images within a user's field of vision.

The housing 206 may further include a power unit 210 and a processing unit 212. The power unit 210 may include one or more batteries, charging ports, or other power sources. The power unit may be configured to power one or more components of wearable device 200. The processing unit 212 may include one or more computer processors, one or more electronic storage medium components (e.g., computer memory, Random Access Memory (RAM), etc.), one or more wired or wireless communication components (e.g., physical communication ports, cables, antenna, wireless transceivers, etc.), other control circuitry components, or other components.

In some embodiments, with respect to FIG. 2B, the housing 206 may further include one or more inward directed sensors 214, which may be inward directed image sensors or other eye-tracking sensors. In an example, inward directed sensors 214 may include infrared cameras, photodetectors, or other infrared sensors, configured to track eye movement, to determine and track visual axes of the user, to track and determine eye gaze directions, and to track and determine other eye-related movement. The inward directed sensors 214 (e.g., comprising infrared cameras) may be located in upper portions relative to the displays 202, 204, so as to not block the visual field of the user, nor their real visual field, nor a visual field displayed or projected to the subject. In some examples, the inward directed sensors 214 may be embedded within the displays 202, 204 to provide a continuous interior surface.

The system may determine errors and/or inconsistencies. In some embodiments, the system may determine an error associated with a file by using a machine learning model trained to identify inconsistencies within files. In some embodiments, the machine learning model may be trained to identify inconsistencies within a given file. For example, the machine learning model may be configured to receive as input, a file, and determine based on the file, one or more errors or other inconsistencies included within the file. In some embodiments, the machine learning model may be trained to identify inconsistencies (or other errors) of one file with respect to other files. For example, the machine learning model may be configured to receive, as input, a file and one or more other files that are related to the file, and determine based on the file and the one or more other files, inconsistencies or other errors between the file and the one or more other files. As another example, the machine learning model may be configured to receive, as input, a file, and determine based on the file, inconsistencies or other errors between the file and one or more other files related to the file (e.g., based on one or more updated parameters of the machine learning model being trained on the one or more other files). By using a machine learning model to determine errors associated with a file, the system may provide quick and accurate identification of errors within files. Moreover, by using a machine learning model to determine errors associated with a file, the system may provide dynamic identification of errors within files (e.g., where there may exist unknown or previously unidentified errors), thereby improving the user experience (e.g., as the user may be presented with indications of errors that may be unknown or unidentified in training data to which the machine learning model is trained on).

Figure 3:
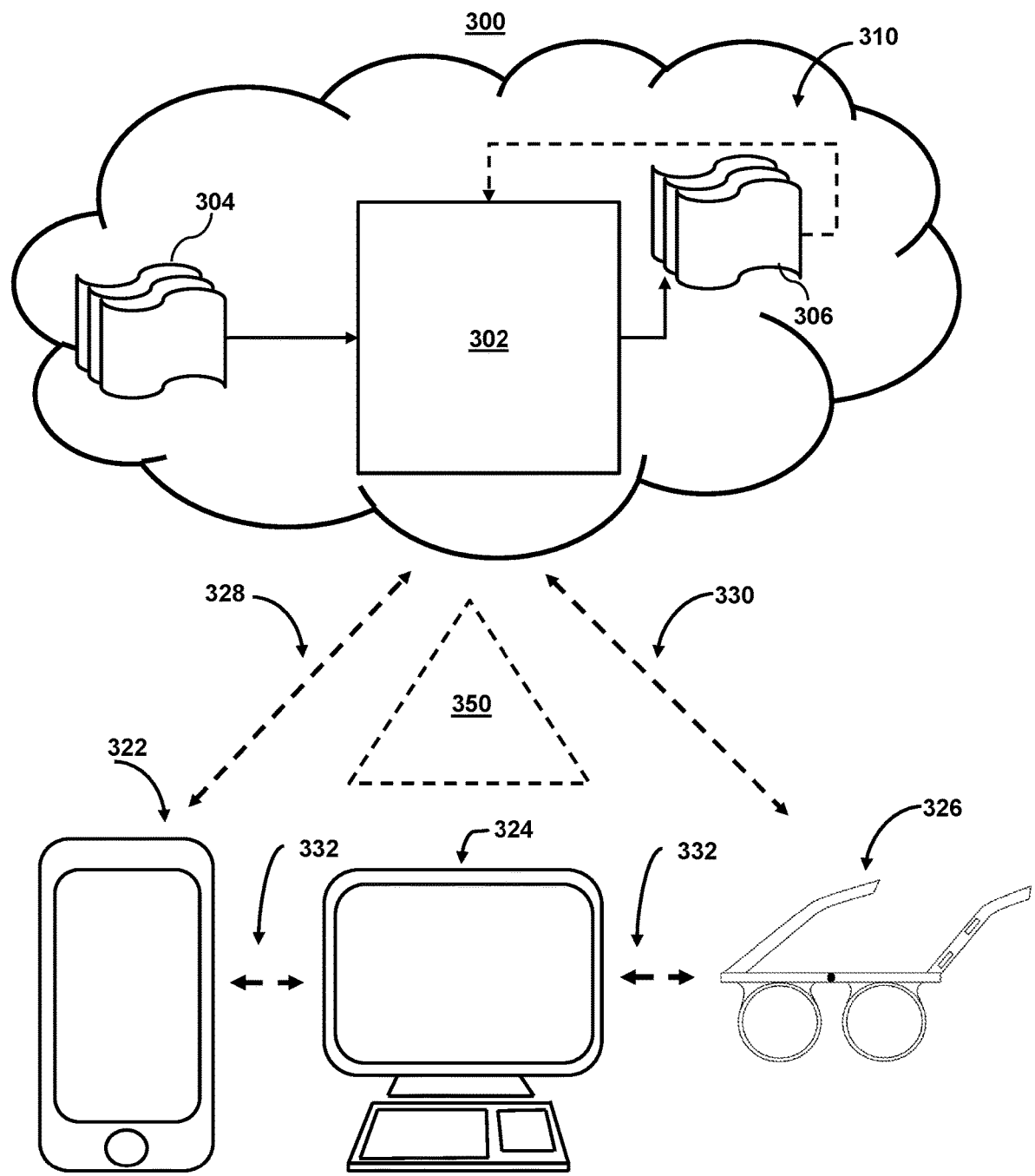
FIG. 3 shows illustrative components for a system used to determine errors associated with a file, in accordance with one or more embodiments.

FIG. 3 shows illustrative components for a system used to determine errors associated with a file, in accordance with one or more embodiments. For example, FIG. 3 may show illustrative components for presenting visual indications of errors associated with a file and presenting visual indications of other files related to the error (or other inconsistency). As shown in FIG. 3, system 300 may include mobile device 322, user terminal 324, and wearable device 326. While shown as a smartphone, personal computer, and headset, respectively, in FIG. 3, it should be noted that mobile device 322, user terminal 324, and wearable device 326 may be any computing device, including, but not limited to, a laptop computer, a tablet computer, a hand-held computer, and other computer equipment (e.g., a server), including "smart," wireless, wearable, and/or mobile devices. In some embodiments, wearable device 326 may correspond to wearable device 200 (FIGS. 2A-2B) or wearable device 104 (FIG. 1), in accordance with one or more embodiments.

FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to four devices. Users may for instance, utilize one or more devices to interact with one another, one or more servers, or other components of system 300. It should be noted, that while one or more operations are described herein as being performed by particular components of system 300, these operations may in some embodiments, be performed by other components of system 300. As an example, while one or more operations are described herein as being performed by components of wearable device 326, these operations may in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, wearable device 326, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., files, documents, visual indications of errors, visual indications of files, messages, notifications, etc.). Additionally, as shown in FIG. 3, wearable device 326 may include one or more displays to display data or project data onto the eyes of a user.

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices (e.g., mobile device 322, user terminal 324, and wearable device 326) may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may access one or more computing systems (e.g., local or remote computing systems), databases (e.g., system database 432 (FIG. 4)), servers (e.g., computing system 402 (FIG. 4)), client devices (e.g., client device 404 (FIG. 4)), or other devices or systems. For example, as will be discussed, cloud components 310 may access information such as file identifiers, file types, files, file packages, training data, prediction models (e.g., machine learning models), data structures, device identifiers (e.g., serial numbers, bar codes, etc.), software identifiers (e.g., software names, software version identifiers, software type identifiers, etc.), or other information, in accordance with one or more embodiments.

Cloud components 310 may include model 302, which may be a machine learning model, artificial intelligence model, or other intelligent model (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., errors associated with a file, errors between a file and other files, inconsistencies associated with files, inconsistencies between a file and other files, portions of a file associated with an error, portions of a file associated with an error and other portions of files associated with the error, or other error or inconstancy-related predictions).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., whether a file is associated with an error, whether a file is associated with an inconsistency, whether an error is associated with a file based on one or more other files, whether an inconsistency is associated with a file based on one or more other files, whether a portion of a file is associated with an error, whether a portion of a file is associated with an inconsistency, whether a portion of a file is associated with an error based on one or more other portions of one or more other files, whether a portion of a file is associated with an inconsistency based on one or more other portions of one or more other files, or other classifications of model 302, in accordance with one or more embodiments).

In some embodiments, the model (e.g., model 302) may automatically perform actions based on outputs 306. In some embodiments, the model (e.g., model 302) may not perform any actions. The output of the model (e.g., model 302) may be used to generate one or more visual indications of errors associated with a file, one or more visual indications of other files associated with the error (or inconsistency), to generate one or more data structures configured to link files together (e.g., link one file associated with an error to other files associated with the error, to link a portion of a file associated with an error to other portions of other files associated with the error, etc.), to generate one or more messages to a user (e.g., indicating error-related information), to generate training data for training machine learning models (e.g., new training data, updated training data, supplementing preexisting training data, etc.), or may be used to perform other actions, in accordance with one or more embodiments.

Figure 4:
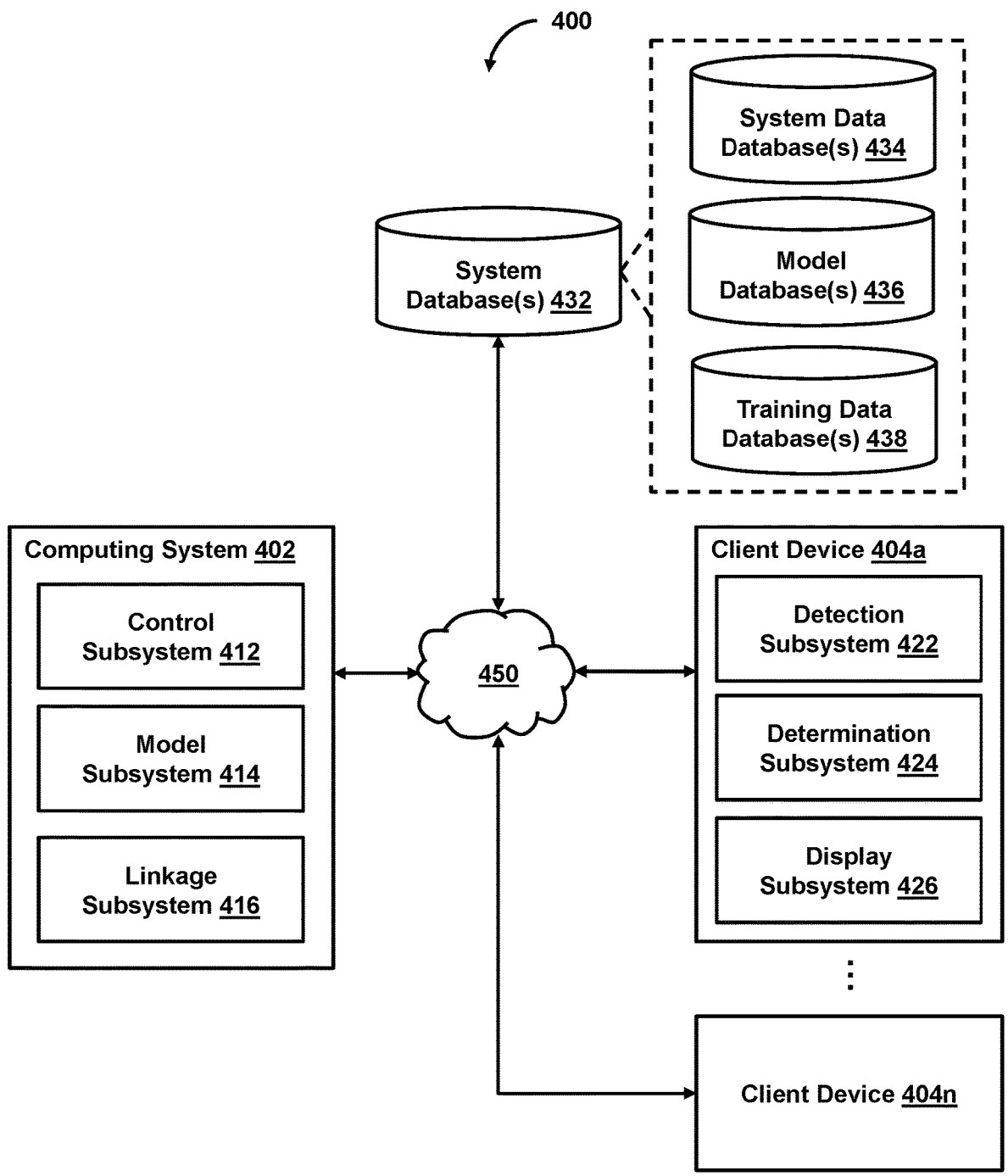
FIG. 4 shows a block diagram of a system used to display visual indications of one or more files that are associated with a file being viewed via an wearable device, in accordance with one or more embodiments.

In some embodiments, model subsystem 414 (FIG. 4) may train or configure one or more prediction models to facilitate one or more embodiments described herein. In some embodiments, such models may be used to determine whether a file is associated with an error, whether a portion of a file is associated with an error, or whether any other errors or inconsistencies are associated or exist with respect to a file. Additionally, such models may be trained to identify inconsistencies within a file, within files, between one file and one or more other files, between portions within a file, between portions of one file with respect to portions of other files, or other errors or inconsistencies. Moreover, such models may be trained or configured to perform the foregoing functions by respectively mutually mapping input data and output data in nonlinear relationships based on learning (e.g., deep learning). In some embodiments, one or more pre-trained prediction models may be stored in model database 436 (FIG. 4) or stored in client device 404 (FIG. 4).

In some embodiments, model 302 may be trained based on information regarding a plurality of related files. For example, model 302 may receive as input, a file and one or more files that are related to the file, to generate predictions as to whether an error (or other inconsistency) is associated with the file. Additionally or alternatively, model 302 may receive as input a file to generate predictions as to whether an error is associated within the file (e.g., without respect to one or more other files). In this way, model 302 may discover relationships within a file, within a file with respect to other files, within portions of a file with respect to other portions of other files, or other relationships to generate robust predictions as to whether any errors or inconsistencies exist or are associated with the file.

As an example, model 302 may be trained on training data. Training data may be stored in system database 432 (FIG. 4). For instance, model subsystem 414 (FIG. 4) may obtain training data from training data database 438 to train model 302. As another example, model subsystem 414 (FIG. 4) may retrieve a pre-trained model from model subsystem 414 (FIG. 4). Model 302 may take the training data as input 304, and generate a prediction indicating whether an error is identified in a file as output 306. For instance, input 304 may include training data that includes information regarding a file (e.g., or other document) and one or more other files that are related to the file. The training data may include one or more labels such that the training data is labeled to train model 302. For instance, the labels that may indicate a file identifier, a file type identifier, a portion of a file known to be associated with an error (e.g., a portion of a file including an error), portions of other files that are related to the file (e.g., portions of the other files that are related to a portion of the file that is associated with an error), or other labels. Such training data may also include labeled output data such that, during a training routine of model 302, when the input training data is provided to model 302, the output of model 302 (e.g., with respect to the input training data) may be compared to known output data. In some embodiments, the generated prediction(s) may be fed back into model 302 to update one or more configurations (e.g., weights, biases, or other parameters) based on its assessment of its prediction (e.g., outputs 306) and reference feedback information (e.g., user indication of accuracy, reference labels, or other information). Output 306 may include an indication as to whether the file includes an error or other inconsistency, whether the file includes an error or other inconsistency with respect to the one or more other files related to the file, one or more portions of the file that is associated with the error, one or more portions of the file that is associated with the error with respect to one or more other portions of the one or more other files that are related to the one or more portions of the file that is associated with the error, or other error-related information. For example, output 306 may include an indication to a portion of a file (e.g., a line (e.g., of text), a phrase, a paragraph, a word, an image, or other portion of the file) that is associated with an error. Additionally, output 306 may include an indication to other portions of the other files that are related to the file that is associated with an error. For instance, a first portion of a first file may include information that does not match or is inconsistent with a second portion of a second file, thereby linking the first portion and the second portion together to indicate an inconsistency between the first and second portion. As such, output 306 may include the first portion of the first file and the second portion of the second file such that, as will later be explained, the system may present visual indications of errors associated with a file and one or more other portions of one or more other files to enable a user to quickly identify where errors exist within a file and the one or more other files related to the file. In some embodiments, output(s) 306 may be stored in system data database 434 (FIG. 4) for later retrieval (e.g., by client device 404), such as to generate one or more data structures, generate visual indications of errors, or other functions, in accordance with one or more embodiments.

In some embodiments, the model 302 may be trained on training data including a set of files. For example, each file of the set of files may include (i) a file type identifier (e.g., indicating a type of file) and (ii) one or more labels corresponding to respective inconsistencies within one or more files within the set of files as related to a subset of files within the set of files. For instance, each file of the set of files may be related to one another. As an example, the set of files may include a log file and one or more code files of a file library that are related to the log file. As another example, the set of files may include a loan application and one or more supporting documents (e.g., income statements, revenue statements, credit history, etc.). Each file of the set of files may include a file type identifier (e.g., file identifier or other identifying information of the file) and labels corresponding to one or more portions of the file that are associated with an inconsistency related to a subset of files of the set of files. For example, the labels corresponding to respective inconsistencies within the one or more files within the set of files, as related to a subset of files within the set of files, may be useful for determining whether portions of the files are related to one another and whether inconsistencies exist within the portions of the files with respect to portions of other files.

For example, a loan application may indicate a financial state of a person. A set of files may be related to the loan application (or otherwise support the loan application) and may include, for example, an income statement of the person. To generate accurate predictions indicating whether an inconsistency (or other error) exists between the loan application and the income statement of the person, the loan application may be labeled with one or more labels indicating a file type identifier (e.g., label_1=loan application) and one or more portions of the loan application indicating the type of information or values associated with the portions of the loan application, such as the stated income of the user (e.g., label_2=500,000). Similarly, the income statement may similarly be labeled with labels indicating a file type identifier (e.g., label_3=income statement) and one or more portions of the income statement indicating the type of information or values associated with one or more portions of the income statement, such as the actual income of the user (e.g., label_4=400,000). In such an example, the labels may correspond to respective inconsistencies within the one or more files of the set of files. For example, label_1 and label_3 correspond to the file type identifier, however "label_1" is associated with "loan application" and label_3 is labeled "income statement," thus representing an inconsistency. Similarly, label_2 and label_4 correspond to the amount of income, however "label_2" is associated with a value of 500,000 and "label_4" is associated with a value of 400,000 thus representing an inconsistency. The set of training data (e.g., the set of files) and their respective labels may be provided to the machine learning model in a training routine of the machine learning model to train the machine learning model. In this way, the machine learning model may be trained based on a set of files indicating inconsistencies to enable the machine learning model to learn/discover relationships between one or more files and inconsistencies included therein to accurately predict whether errors or other inconsistencies exist within files.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

FIG. 4 shows a block diagram of a system used to display visual indications of one or more files that are associated with a file being viewed via a wearable device, in accordance with one or more embodiments. As shown in FIG. 4, system 400 may include one or more computing devices, such as computing system 402, client device 404 (or client device(s) 104a-104n), system database 432, or other components. Computing system 402 may include control subsystem 412, model subsystem 414, linkage subsystem 416, or other components/subsystems. Client device 404 may include detection subsystem 422, determination subsystem 424, display subsystem 426, or other components/subsystems. Each client device 404 may include any type of mobile terminal, fixed terminal, wearable device, or other device. By way of example, client device 404 may include a desktop computer, a notebook computer, a tablet computer, a smartphone, a wearable device, or other client device. In some embodiments, computing system 402 may correspond to cloud components 310 (FIG. 3), mobile device 322 (FIG. 3), user terminal 324 (FIG. 3), or other device, in accordance with one or more embodiments. Additionally, in some embodiments, client device 404 may correspond to wearable device 326 (FIG. 3), wearable device 200 (FIGS. 2A-2B), wearable device 104 (FIG. 1), or other device, in accordance with one or more embodiments. Users may for instance, utilize one or more computing systems 402 or client devices 404 to interact with one another, one or more servers, or other components of system 400. The computing devices may include communication lines or ports to enable the exchange of information within a network (e.g., network 450) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

It should be noted that, while one or more operations are described herein as being performed by particular components of client device 404, those operations may in some embodiments, be performed by other components of client device 404 or other components of system 400. Moreover, it should be noted that, while one or more operations are described herein as being performed by particular components/subsystems of client device 404, those operations, in some embodiments, may be performed by other components of computing system 402. As an example, while one or more operations are described herein as being performed by components of client device 404, those operations may in some embodiments, be performed by components of computing system 402. In some embodiments, one or more subsystems of client device 404 may be part of computing system 402. For example, all of detection subsystem 422, determination subsystem 424, and display subsystem 426 or other components of client device 404 may be implemented (or hosted) on computing system 402 to enable client device 404 to receive data or other commands/operations from computing system 402 to display visual indications of one or more files that are associated with a file being viewed via a wearable device. Likewise, in some embodiments, one or more subsystems of computing system 402 may be part of client device 404. For example, all of control subsystem 412, model subsystem 414, linkage subsystem 416, or other components of computing system 402 may be implemented (or hosted on) client device 404 to enable client device 404 to display visual indications of one or more files that are associated with a file being viewed via a wearable device without utilizing computing system 402. Additionally, it should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine learning model in one or more embodiments).

In some embodiments, control subsystem 412 may control communication between one or more components of system 400. For example, control subsystem 412 may receive or transmit data between one or more components of system 400, generate commands, control data flow, or other operations, in accordance with one or more embodiments. In some embodiments, model subsystem 414 may control one or more machine learning model-related functions. For example, model subsystem 414 may receive a machine learning model (e.g., from model database 436), train a machine learning model (e.g., based on training information obtained via training data database 438), provide a machine learning model with inputs, receive machine learning model outputs, may transmit a machine learning model (e.g., to client device 404), or other operations, in accordance with one or more embodiments. In some embodiments, linkage subsystem 416 may link one or more files together or perform other file-linkage-related operations. For example, linkage subsystem 416 may link a first file and a second file together, may link a portion of a first file to another portion of a second file together, may link files together based on determined/identified errors or inconsistencies, may generate or retrieve data structures associating files together (e.g., which may be stored or retrieved in system data database 434), may generate data structures associated portions of files together, or other file linkage operations. As described above, linking may be referred to as associating information of one file to information of another file. For example, a link may be an association between a first file and a second file based on contextual information shared between the first file and the second file, a portion of the first file and a portion of the second file, or other information between files. As such, a link may represent a "bond" or other association between information of two or more files. In some embodiments, a link may represent a bond or other association between portions of information in a single file.

In some embodiments, detection subsystem 422 may perform operations related to detecting whether a user is viewing or fixating on a file/document, whether a user is viewing or fixating on a portion of a file/document, may receive image data (e.g., via one or more image sensors) of documents/files, may receive eye-tracking information (e.g., from one or more eye-tracking sensors), or perform other operations. For example, detection subsystem 422 may receive image data of a file a user is viewing and may also receive eye-tracking information to detect or otherwise determine whether a user is viewing a file/document or a portion of a file/document. In some embodiments, determination subsystem 424 may perform operations related to determining whether a file is associated with an error, whether a file is associated with an inconsistency, determining file identifiers, retrieving file identifier-related information, transmit or receive instructions (e.g., to one or more servers) to obtain error-related information, transmit or receive information related to one or more data structures associated with linking one or more files/documents, determining file types, determining file identifiers, determining whether a user is selecting a visual indication of a file (e.g., via eye-tracking sensor information or gesture recognition sensors), or one or more other determination-related operations. For example, determination subsystem 424 may determine whether a portion of a document/file is associated with a first error by retrieving information from one or more machine learning models (e.g., trained to identify inconsistencies within one or more files.) In some embodiments, display subsystem 426 may perform operations related to generating for display one or more visual indicators. For example, display subsystem 426 may generate for display, one or more overlays, visual indicators of errors or other inconsistencies, visual indicators of one or more files, one or more selectable visual indications, one or more visual representations of links, or other display-related operations.

In some embodiments, system database(s) 432 may be associated with system data database 434, model database 436, training data database 438, or other databases. In some embodiments, system data database 434 may store system-specific information. For example, system data database 434 may store one or more predetermined graphical components, predetermined visual indicators, one or more identified errors or other inconsistencies within files/documents, file identifiers, file types, files, documents, file packages, document packages, error flags, inconsistency flags, data structures, one or more results, datatypes, datatype identifiers, threshold time periods, or other information. Model database 436 may store machine learning model-related information. For example, model database 436 may store one or more pretrained machine learning models, one or more untrained machine learning models, optimization algorithms, or other machine learning model-related information. In some embodiments, training data database 438 may store machine learning model training-related information. For example, training data database 438 may store one or more labeled training datasets comprising one or labels associated with files, file packages, file identifiers, portions of files, errors, inconsistencies, expected outputs, ground-truth information, data types, or other machine learning model training-related data.

Figure 5:
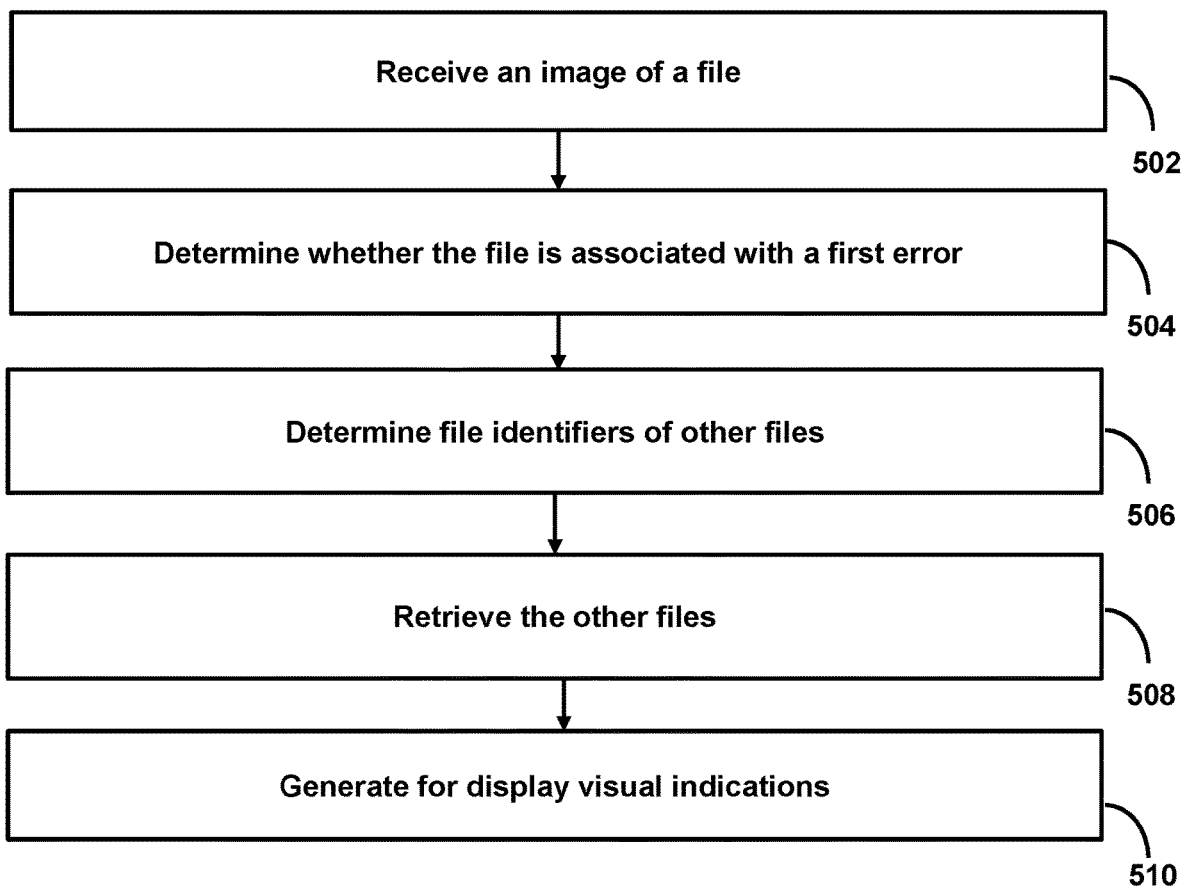
FIG. 5 shows a flowchart of the steps involved in displaying visual indications of one or more files that are associated with a file being viewed via a wearable device, in accordance with one or more embodiments.

FIG. 5 shows a flowchart of the steps involved in displaying visual indications of one or more files that are associated with a file being viewed via a wearable device, in accordance with one or more embodiments. For example, the system may use process 500 (e.g., as implemented on one or more system components described above) in order to present visual indications of errors associated with files and enable fast recognition of errors associated with files that may otherwise be missed.

At step 502, process 500 (e.g., using one or more components described above) may receive an image of a file. For example, the system may receive an image of a file being viewed by a user. For instance, a software developer may be wearing a wearable device, such as an augmented reality headset. The augmented reality headset may include image sensors that may capture an image of a log file being viewed by the software developer when developing a software application. As another example, the augmented reality headset may capture an image of a paper document. For instance, a loan underwriter may be viewing a loan application of an applicant, and the augmented reality headset may capture an image of the loan application being viewed by the loan underwriter. By doing so, the system may obtain images of files or other documents within an environment of a user to enable error detection of errors associated with files being viewed by the user.

In some embodiments, the system may detect that the user is viewing the file (or other document) based on one or more eye-tracking sensors. For example, the augmented reality headset may include one or more eye-tracking sensors configured to detect whether the user is looking at a file or other document. Additionally or alternatively, the eye-tracking sensors may be configured to detect whether the user is fixating on a portion of a file, such as a sentence, paragraph, word, image, video, or other portion of a file. It should be noted, that, in disclosed embodiments, that portion may refer to a part of a whole. For example, a portion of a file may refer to a word included in the file, or, in some embodiments, may refer to multiple words, phrases, or other portions of the file. In some embodiments, process 500 may detect that a user is looking at a portion of a file. In response to detecting that the user is looking at a portion of the file, process 500 may capture (or otherwise receive) an image of the file (or a portion thereof). By doing so, the system may reduce the amount of computer processing and computer memory resources needed by capturing or receiving images of files to which a user is looking at as opposed to continuously capturing images of files or other elements within the environment of a user that the user is not looking at.

In one use case, where the user is a loan underwriter and is viewing a loan application, the loan underwriter may be wearing an augmented reality headset. The underwriter may be in an environment, such as a the underwriter's office which may include multiple objects within the office, such as desks, computers, documents, pens, pencils, or other objects within the underwriters office. The augmented reality headset may track one or more eyes of the underwriter to determine which direction the underwriter is looking. In some embodiments, upon detecting a direction or gaze of the user's eyes, the augmented reality headset may capture one or more images (e.g., via outward facing sensors) to detect whether the user is viewing a document. For example, the augmented reality headset may determine whether the underwriter is viewing a document by first determining what the underwriter is looking at (e.g., a loan application for a vehicle) and the direction the user is looking (e.g., via the eye-tracking sensors detecting a gaze of the user). The augmented reality headset may determine, based on an image of the loan application and the gaze of the user, that the user is fixating on at least a portion of the loan application. As such, the system may capture an image of the loan application that the underwriter is viewing to detect whether any errors or other inconsistencies are present within the loan application.

In some embodiments, a file corresponding to the document (or file) and a file package (e.g., other documents) may be identified based on the received image of the file. For example, the system may identify, from the image, a file corresponding to the document and a file package related to the file. The user (e.g., the software developer) may be viewing a log file. The log file may be identified based on a file identifier associated with the file that is present in the image. To determine whether one or more errors are associated with the log file, the system may perform optical character recognition on the image of the log file to determine a file identifier associated with the file. As an example, a file identifier may be an integer value, an alphanumeric value, text values, hexadecimal values, or other value that may indicate identifying information of a file. Using the determined file identifier, the system may determine a file package that is related to the file. As an example, a file package may include one or more other files that are related to the file (e.g., the log file), which may include one or more files of a file library associated with the identified file, one or more files that include functions or methods that are related to the identified file, one or more files that include information that is associated with the identified file, one or more files that are within a same category as the identified file, or one or more other files that are otherwise associated with the identified file. For example, the identified log file may be associated with a set of files that depend on a function that is written in the file of the identified file. In some embodiments, the system may identify a file package (or one or more other files that are related to the file) by providing the file identifier as a query to a database (e.g., system data database 434 (FIG. 4)) to obtain the file package that is related to the file. In other embodiments, the system may identify the file package by providing the identified file to a machine learning model (e.g., as hosted in model subsystem 414 (FIG. 4)) to receive the file package that is related to the file. By identifying the file and determining a file package related to the file, the system may use the other files included in the file package to determine whether one or more errors are associated with the identified file.

In one use case, where the user is a loan underwriter and is viewing a loan application via an augmented reality headset, the system may identify a file corresponding to the loan application and a file package related to the file, such as a package of supporting financial documents. For example, the augmented reality headset may perform optical character recognition on the loan application to obtain a computer-readable format of the information present within the loan application. In some embodiments, the augmented reality headset may perform natural language processing on the optical character recognized loan application to determine a file identifier indicating identifying information of the loan application (e.g., an indication that the loan application is in fact a loan application). In other embodiments, the augmented reality headset may determine a file type identifier indicating the type of file that the underwriter is looking at (e.g., an application, an income statement, a bank statement, etc.). Using the file identifier or the file type identifier, the augmented reality system (or a remote server/computing system) may access a database including a set of related documents to the loan application. For example, in some embodiments, the augmented reality headset may further identify other information such as the name of the applicant, an address associated with the applicant, or other identifying information to query the database for a set of related document (e.g., a file package). In some embodiments, the augmented reality headset may receive a set of documents or other related files that are related to the loan application to determine whether any errors or other inconsistencies are present with respect to the loan application and the one or more other related documents.

At step 504, process 500 (e.g., using one or more components described above) may determine whether the file is associated with a first error. For example the system may use process 500 to determine whether the file is associated with the first error indicating an inconsistency between the file in one or more other files related to the file. For instance, the inconsistency may be identified based on a difference within file data of the file and the file data within the one or more other files. As an example, a difference within file data of the file and the file data within the one or more other files may be determined by performing natural language processing (NLP) on the file and the one or more other files to determine whether there is a difference of information. For example, process 500 may perform NLP each of the file and each of the one or more other files related to the file, and compare the NLP output of the file to each of the one or more other files related to the file. In response to determining a failure to match the NLP output of the file to NLP output of at least one of the one or more other files related to the file, process 500 may determine that the file is associated with a first error. In some embodiments, identifying the inconsistency (e.g., a difference within file data of the file and the file data within the one or more other files) may be identified using a machine learning model trained to identify inconsistencies within files. Additionally or alternatively, process 500 may determine whether a portion of the file is associated with a first error flag (e.g., indicating an inconsistency between the file and the other files related to the file) by using a machine learning model trained to identify inconsistencies within file packages (e.g., the other files related to the file), where the inconsistency has been linked to the portion of the file. For example, an error flag may be an indication of an error or other inconsistency. As another example, an error flag may be a flag or other notification or message that is generated by the system to indicate an error. By doing so, the system may provide fast recognition of errors associated with files with respect to other files such that a user need not analyze other files to identify one or more errors, thereby improving the user experience.

In some embodiments, process 500 transmits an instruction to a remote server (e.g., computing system 402 (FIG. 4)) to determine whether the file is associated with a first error. The instruction may include (i) a file identifier of the file, (ii) one or more other file identifiers corresponding to the one or more other files, and (iii) an indication to provide the file and the one or more other files related to the file to the machine learning model. For example, a wearable device of the user may transmit the instruction to the remote server. In some embodiments, the remote server may provide the instruction to a machine learning model (e.g., model subsystem 414) hosted on the remote server. The machine learning model hosted on the remote server may process the instruction and may transmit a result (e.g., to the wearable device) indicating whether the file (e.g., that the user is looking at) is associated with a first error. For instance, the result may be based on the machine learning model identifying that at least one portion of the file (e.g., log file) is inconsistent with data within one or more respective files of the one or more other files that are related to the file. By transmitting instructions to the remote server and receiving a response indicating whether a file is associated with an error, the system may reduce the amount of computer processing resources implemented on the wearable device, thus saving valuable battery life of the wearable device.

In one use case, where the user is a software developer developing a software application and is wearing an augmented reality headset, the user may be looking at a log file. While developing the software application, the augmented reality headset may present visual indications of one or more errors associated with the file, and the augmented reality headset may transmit an instruction to a remote server to determine whether the log file that the user is looking at includes an error. For example, the augmented reality headset may transmit an instruction including the file identifier of the file, the file identifiers of the one or more other files related to the file, and an indication to provide the file and the one or more other files related to the file to the machine learning model. In this way, the machine learning model hosted on the remote server may process the instruction and the information included therein to provide the augmented reality headset with a result indicating whether the file is associated with the first error. For instance, the remote server may transmit a result indicating that the file is associated with a first error (or other inconsistency). As another example, the remote server may transmit a result indicating that no error is associated with the file.

In another use case, where the user is a loan underwriter underwriting a loan application for a vehicle wearing an augmented reality headset, the system may determine whether the loan application includes any errors or other inconsistencies with respect to supporting documents of the loan application (e.g., income statements, bank statements, industry performance documents, current debt documents, etc.). As such, to save the battery life of the augmented reality headset, the headset may provide an instruction to the remote server to determine whether the loan application includes any errors. For instance, the augmented reality headset may transmit a file identifier of the loan application, file identifiers of the other supporting documents for the loan application, as well as the loan application and the other supporting documents to the remote server to enable the remote server-hosted machine learning model to provide a result. The result may include an indication that the loan application includes an error or other inconsistency with respect to the supporting documents. For instance, the machine learning model may indicate that a portion of the loan application (e.g., an applicant indicated income level) is different than that of what the applicant's bank statement indicated. As such, the remote server may transmit such result to the augmented reality headset to generate one or more visual indications of the error in an augmented reality environment to the user, thereby improving the user experience.

In some embodiments, process 500 may determine whether a portion of the file (or other document) is associated with a first error. For example, to enable better visual indications of errors associated with a file, it may be advantageous to determine the portion of the file that is associated with the file as opposed to the whole file. In this way, users may be made aware of which exact portion of the file is associated with the error, thereby improving the user experience as users need not further analyze the file to "guess" where the error may exist. As such, in some embodiments, and as described above, the machine learning model may be further trained to identify portions of a file that are inconsistent with data within one or more respective files of one or more other files that are related to the file.

For example, process 500 may transmit an instruction to a remote server to determine whether the file (or a portion thereof) is associated with an error (e.g., an error flag). For instance, where a loan underwriter is reviewing a loan application for a loan applicant, process 500 may transmit an instruction to the remote server to determine whether any errors of other inconsistencies exist within the loan application, with respect to supporting financial documents. The instruction may include a file identifier of the file (e.g., the loan application), one or more other file identifiers corresponding to the one or more other files related to the file (e.g., a title of a supporting financial document, a name of a supporting financial document, a version of a supporting financial document, etc.), and an indication to provide the file and the one or more other files to a machine learning model.

The machine learning model (e.g., which may be hosted on the remote server), may process the instruction including the file identifiers and the files themselves, and generate one or more outputs indicating a plurality of errors. For example, each error of the plurality of errors may indicate an inconsistency between the file (or a portion thereof) and a respective file (or portion thereof) of the one or more other files related to the file. For instance, with respect to a loan application, the errors may represent an inconsistency between a portion of the loan application, such as the name of the applicant, and a portion of a W-2 indicating a different name.

Additionally or alternatively, the plurality of errors may indicate file identifiers of the respective files of the one or more other files related to the file. For instance, the errors may be associated with the file identifiers of the respective other related files to enable process 500 to generate a data structure. The remote server may provide the plurality of errors to the client device (e.g., the augmented reality headset), the client device may generate a data structure using the plurality of errors. For example, the data structure may associate each inconsistency between the file (or portion thereof) to the other portions of the other files related to the file and the corresponding file identifiers associated with the respective portion of the respective file of the other files related to the file. For instance, the data structure may be a list, table, array, dictionary, graph, directed graph, tree, or other data structure that may store information that associates an error of one file (or a portion thereof) to an error of another file (or a portion thereof). In some embodiments, the system may store the generated data structure to enable a user to obtain the files that are related to the file to verify whether an inconsistency or other error exists.

In some embodiments, process 500 may transmit a second instruction to a remote server to obtain a data structure. For example, in response to a result (e.g., from the machine learning model) indicating that a file (or a portion therein) is associated with the first error, process 500 may transmit a second instruction to the remote server to obtain a data structure. For example, the data structure may be any data structure configured to store error-related information of the file and the other files related to the file. For instance, the data structure may be a list, table, array, dictionary, graph, directed graph, tree, or other data structure. In some embodiments, the data structure may be generated by the remote server. For example, the remote server may correspond to computing system 402 (FIG. 4) and linkage subsystem 416 may generate the data structure. The data structure may include the first portion of the file (e.g., associated with the error) and one or more other portions of respective files of the one or more other files. The first portion of the file may be linked to the one or more other portions of the respective files of the one or more other files to indicate an association between inconsistent information.

As an example, a loan underwriter may be wearing an augmented reality headset to process a loan application of a loan applicant. The augmented reality headset may provide the loan application and other supporting documents (e.g., income statements, pay stubs, credit applications, current debts, etc.) to the remote server to determine whether the loan application includes any errors or other inconsistencies with respect to the other supporting documents. The remote server may use a machine learning model to determine whether any errors or other inconstancies are present. In response to the result indicating that the loan application (or a portion of the loan application) is associated with an error, the augmented reality headset may receive a data structure including the portion of the loan application associated with the error and other portions of the supporting documents that are associated with the error (e.g., the portion of the loan application). As the data structure may link the portion of the loan application associated with the error to the other portions of the supporting documents that are associated with the error, the data structure may be stored on the augmented reality headset to enable the loan underwriter to verify whether an error exists.

Additionally or alternatively, the data structure may also be used to present (i) visual indications in an augmented reality environment of where an error exists with respect to the loan application and (ii) visual indications in the augmented reality environment of the supporting documents (or portions thereof) that are associated with the identified error. In this way, the loan underwriter may be provided with a surplus of information to enable fast identification of errors or other inconsistencies within the loan application. Moreover, the data structure may also be stored to be used as an underwriting-specific record (e.g., to enable underwriters to reference the information later when auditing a loan or other referencing related functions).

In some embodiments, the data structure may be a graph data structure. For example, to link portions of a file to other portions of other files associated with an error, the remote server may generate a graph data structure that includes nodes and edges. For example, each node of the graph data structure may indicate portions of the file and the portions of the other files related to the file. As another example, each edge of the graph data structure may represent links between each of the nodes. For instance, the edges of the graph data structure may represent a link that indicates an inconsistency between a portion of the file and a portion of a file of the other files related to the file. In this way, the system may link portions of a file (e.g., a loan application) to other portions of other files (e.g., supporting documents) that include inconsistent information to enable a user (e.g., a loan underwriter) to quickly identify whether errors exist within a loan application.

In some embodiments, the machine learning model may output inconsistency indicators. For example, to present visual indications of errors associated with the file and visual indications of other files that are related to the file and associated with the errors included in the file, the system may use a machine learning model's output indicating inconsistency indicators to later provide visual indications of the error and other files related to the file in an augmented reality environment. As such, process 500 may receive one or more other files (or a file package including the file and the one or more other files related to the file). Process 500 may determine a type of file for each file of the file and the one or more other files. For example, each file may be associated with a file identifier identifying the file which may indicate a type of file. A file type may refer to a category associated with one or more characteristics. For example, a log file type may be a data file that includes information about usage patterns, activities, and operations within an operating system or software application. As another example, a loan application may be associated with an application type that includes information related to applying for credit, such as income, current debts, etc. It should be noted, that other types of files may be present, in accordance with one or more embodiments. Process 500 may determine a type of file for each file of (i) the file and (ii) the one or more other files (e.g., related to the file). Process 500 may additionally determine, for each type of file (e.g., of the file and the one or more other files), portions of each file based on a data type of each portion. For example, a data type may refer to a characteristic of the data included within a portion. For example, a data type may be an integer value, an alphanumeric value, text values, hexadecimal values, or other value types. By determining data types for each portion of a file, the system may accurately compare portions of one file to portions of another file to determine whether inconsistencies between information included in corresponding portions exist based on their data type, thereby reducing the amount of computer processing and memory resources required to transform or otherwise translate differing data types when comparing portions.

Upon determining portions of each of the files, process 500 may determine sets of files of the one or more other files that are related to each portion of the first file. For example, process 500 may generate sets of files, where each set of the set of files corresponds to a given portion of the file. As an example, where the file is a loan application and the other files are supporting documents related to the loan application, process 500 may use the determined portions of the loan application (e.g., the name, the address, the income level, the credit, etc.) of the loan application and generate sets of files that are each related to one of the portions of the loan application. For example, a first file set may include the supporting documents that are related to the name of the loan applicant. A second file set may include files, such as the supporting documents that are related to the income level of the loan applicant. Generating such sets of files may be based on the data type of each respective portion of the file and the data type of the respective portions of the other files that are related to the file. By generating sets of files that are each related to respective portions of the file, the system may pre-categorize the files that are related to the file to enable more efficient identification of errors or other inconsistencies within the file, thereby reducing the amount of computer processing and memory resources required to generate predictions of errors or other inconstancies.

Upon generating the sets of files, process 500 may provide (i) the file, (ii) the one or more sets of files, (iii) indications of each portion, and (iv) indications of each set of files for each portion into a machine learning model. For example, the indications of each portion may represent a data type corresponding to the portion. As another example, indications of each set of files for each portion may represent the data type corresponding to the portions of each file in the respective set of files. The machine learning model may output, for each portion, an inconsistency indicator. For example, the inconsistency indicator may indicate whether there is an inconsistency between each portion of the file and a corresponding set of files. For instance, as each file set of the sets of files are categorized based on their relationship (e.g., data type, file type, etc.), the inconsistency indicator may indicate whether the portions of the files within a respective file set (e.g., supporting documents) are collectively inconsistent with that of the file (e.g., the loan application). By doing so, the system may generate accurate predictions as to whether an error or other inconsistency is included in a file by comparing portions of a plurality of files to a respective portion of a file.

At step 506, process 500 (e.g., using on or more components described above) may determine file identifiers of other files. For example, process 500 may determine file identifiers corresponding to the one or more other files (e.g., that are related to the file). Process 500 may determine the file identifiers by performing natural language processing (NPL) on the files to determine a title, name, or category of a respective file. For example, where the file is a loan application and the one or more other files are supporting documents (e.g., financial documents, statements, reports, W-2's, paystubs, industry performance documents, etc.), process 500 may perform NPL on each of the files to determine a type, name, category, title, or other identifying information related to the files. In other embodiments, process 500 may determine the file identifiers by providing the files to a machine learning model to obtain predictions related to a file identifier of a respective file. In yet other embodiments, process 500 may determine the file identifiers based on a user indication of a file identifier. By doing so, the system may obtain the file and the other files related to the file based on their respective file identifiers to generate visual indications of the file (or a portion thereof) and visual indications of the other related files (or portions thereof) that are associated with an error or other inconsistency to enable a user to quickly identify errors associated with a file.

At step 508, process 500 (e.g., using one or more components described above) may retrieve the other files. For example, process 500 may in response to determining that a file is associated with an error (or a portion of the file being associated with an error), retrieve the one or more other files (e.g., within a file package) that are associated with the error (or other inconsistency) using the one or more determined file identifiers. For instance, where the one or more other files are supporting documents for a loan application, process 500 may query a database storing the supporting documents based on the determined file identifiers to obtain the supporting documents. By doing so, the system may reduce the amount of computer processing and memory resources required to obtain the one or more other files associated with the error by accessing the files based on a file identifier as opposed to parsing through each file for error-related information.

At step 510, process 500 (e.g., using one or more components described above) may generate for display, visual indications. For example, process 500 may generate for display, on one or more augmented reality displays, a visual indicator indicating an error associated with the file and one or more visual indications of the one or more other files associated with the inconsistency (or other error associated with the file). A visual indicator indicating an error may be a highlighting of the error, a geometric shape encasing an error, a color-coded shape encasing an error, a numerical or alphanumerical indicator associated with the error, an underlining of the error, a color-coded underlining of the error, a line (e.g., dotted line, hashed line, solid line, or other line), or other visual/graphical indicator. Such visual indicators may be presented in an augmented reality environment to enable a user, such as a software developer, or a loan underwriter, to quickly identify potential errors of a file or other document that they may be viewing.

Additionally, process 500 may generate for display, on one or more augmented reality displays, one or more visual indications of the one or more other files associated with the inconsistency (or other error). For example, when a software developer is developing a software application, a log file the developer is viewing may indicate an error. As opposed to existing systems that may merely display the log file, process 500 may not only generate a visual indication pointing out the exact error and its relative location within the log file, but may also provide a visual indication of a set of files that are directly related to the determined error. In this way, the user may view the files that are related to the error to resolve the determined error.

Figure 6A:
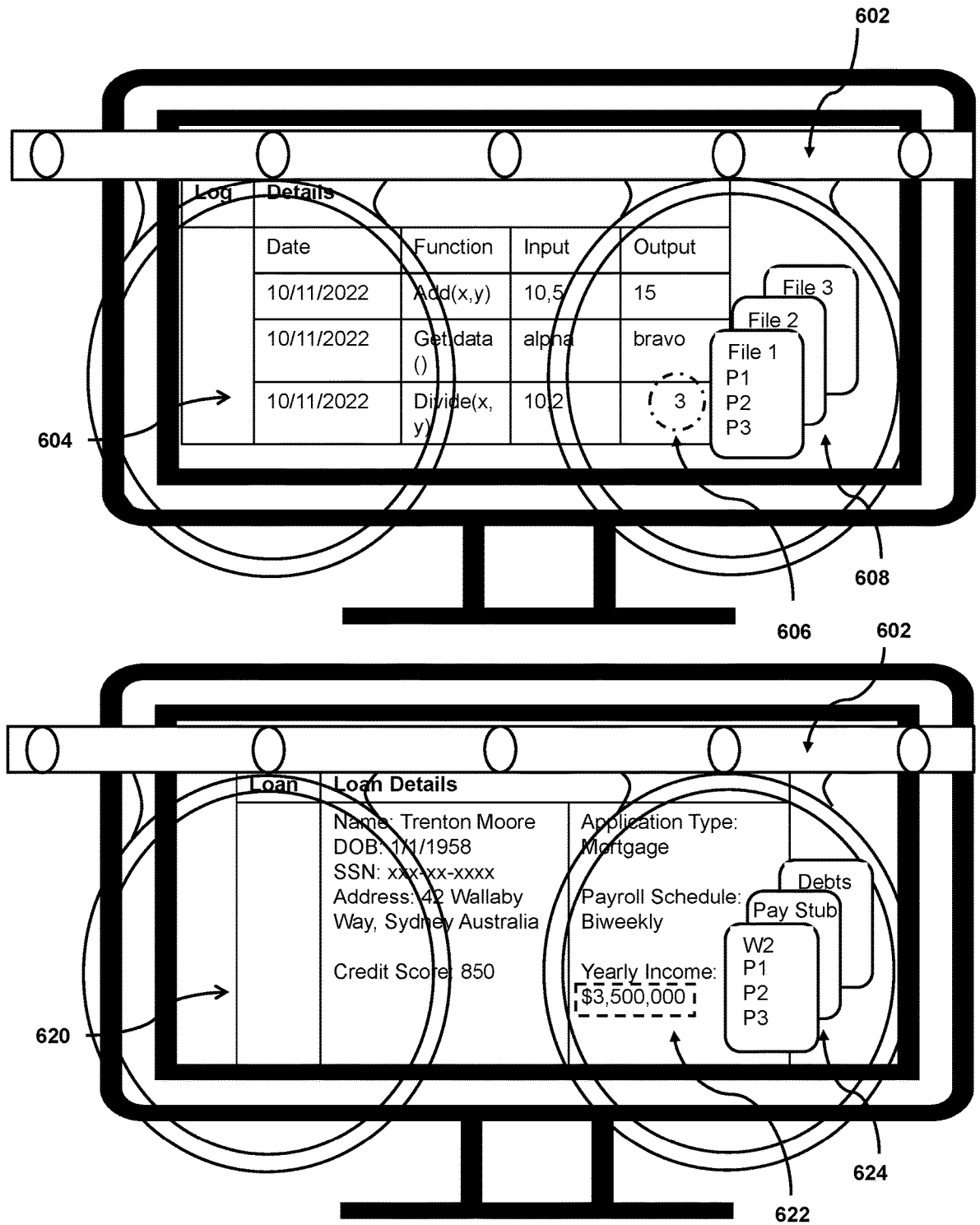
FIGS. 6A-6D show illustrative presentations of visual indications of an error associated with a file and visual indications of one or more files associated with the error, in accordance with one or more embodiments.

Referring to FIG. 6A, FIG. 6A shows an illustrative presentation of a visual indication of an error associated with a file and visual indications of one or more files associated with the error. As an example, a software developer may be wearing a wearable device, such as augmented reality headset 602, while developing a software application. During software development, the developer may view a log file 604 which may be associated with an error. To notify the software developer of an error associated with the log file, process 500 may generate for display, a visual indicator of the error associated with the file on one or more augmented reality displays, such as error indicator 606. As shown in FIG. 6A, error indicator 606 is an overlay over a portion of the log file 604 that is associated with the error. It should be noted, that the error indicator may be any visual indicator, such as a shape encasing an error, a line underlining the error, a highlighting of the error, or other visual stimuli configured to indicate that an error may be associated with the file or a portion of the file.

Additionally or alternatively, process 500 may generate one or more visual indications of one or more other files that are associated with the error (or other inconsistency). For example, as shown in FIG. 6A, visual indications of files that are related to the error are shown as file-visual-indicators 608. File-visual-indicators 608 may include the files that are related to the error associated with the log file 604 (or a portion of the log file 604). In some embodiments, the visual indications of files that are related to the error may be presented proximate to the error (e.g., of log file 604, or a portion of the file associated with the error). In disclosed embodiments, proximate may refer to a distance between one visual indicator to another. For example, presenting the visual indications of the one or more files proximate to the error may be within a predetermined threshold distance (e.g., measured in pixels, millimeters, centimeters, inches, or other distance). By presenting visual indications of files that are associated with the error (or other inconsistency), a user, such as a software developer, may be notified of the files that are directly associated with the error, thereby improving the user experience as the user may identify the files related to the error to resolve the error.

As another example, in the context of loan underwriting, a loan underwriter may be viewing a loan application 620. The loan application may include information such as the name, address, date of birth, credit score, application type, payroll information, income information, and other information related to a loan application. During loan review, the loan underwriter may wear an augmented reality headset 602 to aid the underwriter in determining whether any errors or other inconsistencies exist. In accordance with one or more embodiments, the augmented reality headset 602 may receive an image of the loan application 620, and may determine whether the loan application 620 is associated with an error with respect to supporting documents 624. If it is determined that the loan application 620 (or a portion of loan application 620) is associated with an error, the augmented reality headset may generate for display an error indicator 622. For instance, the error indicator 622 is shown as a geometric shape (e.g., the dashed box) encompassing the error. In some embodiments, in response to determining that the loan application 620 is associated with an error, the augmented reality headset 602 may generate for display a visual indication of the one or more supporting documents 624. In this way, a loan underwriter may be notified of (i) an error or inconsistency present in the loan application and (ii) supporting documents that are related to the error or inconsistency, thereby improving the user experience and reducing loan application review time.

Returning to FIG. 5, in some embodiments, process 500 (e.g., using one or more components described above) may detect a user selection of a visual indication of a selectable visual indication of the one or more other files. For instance, the visual indications of the one or more other files (e.g., as described above) may be selectable visual indications of the one or more other files. That is, to enable fast resolution of one or more errors associated with a file, a user may select one or more of the visual indications of the one or more other files (e.g., that are related to the file or related to the error indicated in the file) to view one or more of the related files. To enable the user to select one or more of the visual indications of the one or more other files, such selection may be based on eye-tracking of the user's eyes.

As such, process 500 may monitor one or more eyes of the user using one or more eye-tracking sensors. For example, the wearable device, such as the augmented reality headset, may include one or more eye-tracking sensors. Process 500 may determine, based on the monitoring, that the user is fixating on a visual indication of the one or more files that are related to the file (or a visual indication of the one or more files that are related to the error). Process 500 may then determine a time period indicating an amount of time that the user is fixating on a visual indication of a file that is related to the file. For example, the time period may be determined by monitoring the eyes of the user via the eye-tracking sensors, and determining whether the eyes of the user remains fixed on at least one of the visual indications of a file related to the file. The time period may be measured in milliseconds, seconds, minutes, hours, or other time metric. Process 500 may compare the determined time period to a threshold time period to determine whether the determined time period (e.g., as determined based on the monitoring of the eyes of the user) satisfies the threshold time period. For example, the threshold time period may be a predetermined time period such as 1 second, 2 seconds, 3 seconds, 1 minute, 2 minutes, or other predetermined time period. The determined time period may satisfy the predetermined time period when the determined time period meets or exceeds the predetermined time period. In response to the determined time period satisfying the threshold time period, process 500 may generate for display, on the one or more augmented reality displays, an updated visual indication for each one of the one or more visual indications of the one or more other files associated with the inconsistency. For example, the updated visual indication of each one of the one or more visual indications of the one or more other files associated with the error may be an enlargement of the one or more visual indications of the one or more other files associated with the error. For example, the visual indications may be enlarged to enable a refined user selection of one or more of the files that are related to the error.

Figure 6B:
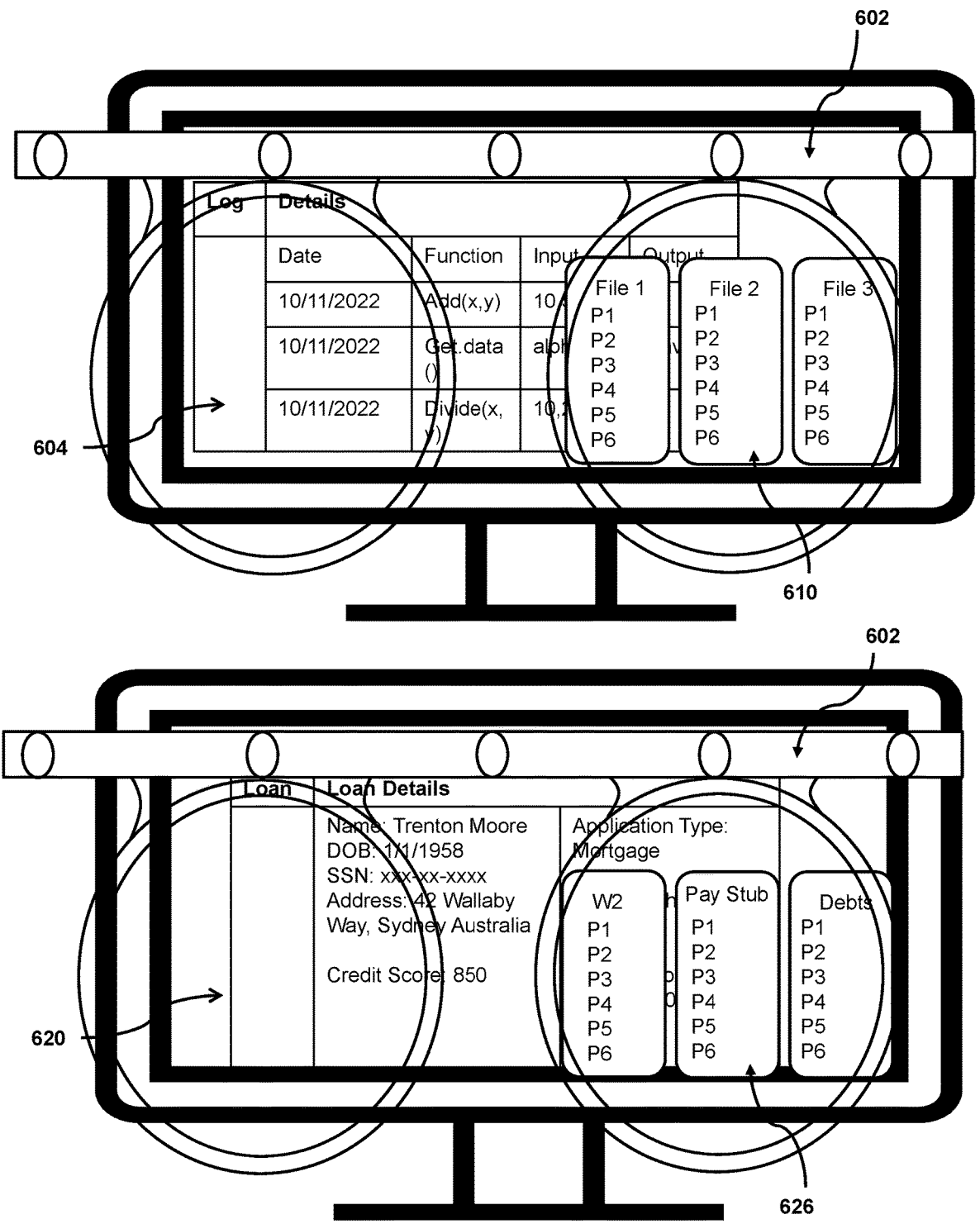

As an example, referring to FIG. 6A, a user may be fixating on one or more of the visual indications (file-visual-indicators 608) of the one or more file that are related to the error for a time period that satisfies a threshold time period. In response to determining that the time period satisfies the threshold time period, the system may generate an updated visual indication of the file-visual-indicators 608 that expand each of the files of the file-visual-indicators 608 to enable a selection of one or more of the files that are related to the error. Additionally or alternatively, by expanding each of the files of the file-visual-indicators 608, the files may also be enlarged. For example, referring to FIG. 6B, updated-file-visual-indicators 610 may correspond to file-visual-indicators 608, although, due to the updating, are now presented as expanded visual indications of the one or more files that are associated with the error. By doing so, the system may enable a user to quickly view files that are associated with the error to quickly resolve any errors associated with the file, thereby improving the user experience. Additionally, by presenting an expanded view of the files that are associated with the error, a user may also be enabled to select one or more of the files that are associated with the error for a more detailed analysis to resolve errors associated with the file, thereby improving the user experience.

As another example, referring back to FIG. 6A, in the context of loan underwriting, a loan underwriter may fixate on one or more of the supporting documents 624. For instance, the augmented reality headset 602 may detect, via one or more eye-tracking sensors, that the loan underwriter is fixating on one or more of the supporting documents 624. That is, the loan underwriter may be fixating on one or more of the supporting documents 624 indicating that the loan underwriter would like to review the supporting documents in depth. As such, the augmented reality headset 602 may determine whether the loan underwriter is fixating on the supporting documents 624 for a threshold amount of time. If the loan underwriter fixates on the supporting documents 624 for a threshold amount of time (e.g., 3 seconds, 4 seconds, 5 seconds, etc.), the augmented reality headset may generate an updated view of the supporting documents 624. For example, referring to FIG. 6B, upon the augmented reality headset determining that the loan underwriter fixates on the supporting documents 624 for a threshold amount of time, the augmented reality headset 602 may generate expanded supporting documents 626. In this way, the loan underwriter may perform a quick analysis of the supporting documents that are related to the error identified in the loan application 620, thereby improving the user experience.

Returning back to FIG. 5, in some embodiments, process 500 may generate for display, on the one or more augmented reality displays, a selected file. For example, process 500 may determine, based on gesture recognition, a user selection of an updated visual indication of the one or more selectable visual indications of the one or more other files associated with the error (or other inconsistency). For example, a user may want to view a particular file that is related to the error to obtain a deeper analysis of how to resolve an error, or an indication to why an error exists. As such, the user may select one or more of the files that are related to the error to view specific information (e.g., a portion of the file) that may give reason as to why an error is being determined. As such, process 500 may in response to the user selection, generate for display, a selected file corresponding to the selected updated visual indication with an image of the selected file, where the selected file is linked to a highlight of a portion of the selected file. For example, process 500 may present the user-selected file with one or more portions of the selected file highlighted to indicate which portions of the selected file is associated with the error. By doing so, the system may enable a user to quickly identify the cause of an error, thereby improving the user experience.

Figure 6C:
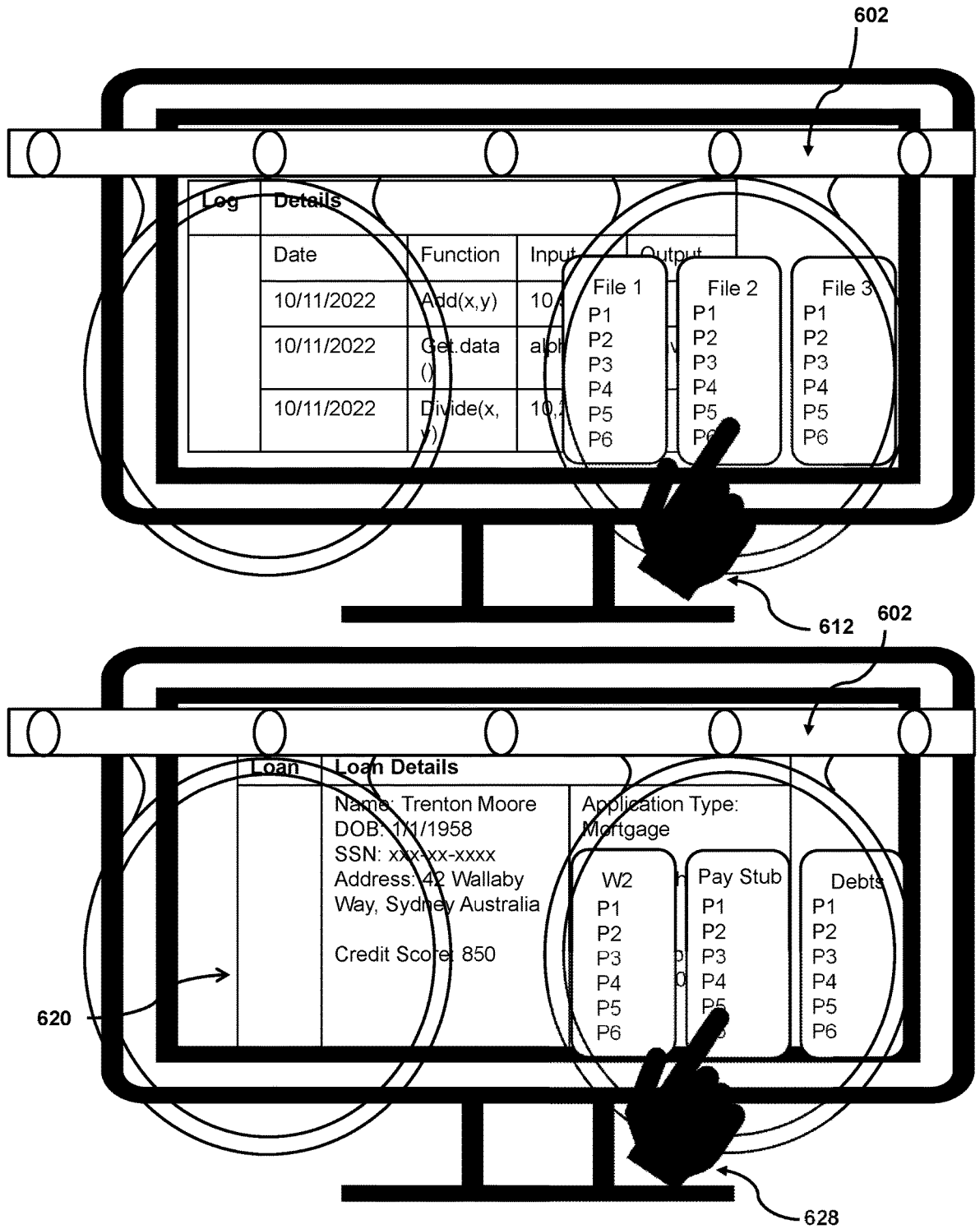
Figure 6D:
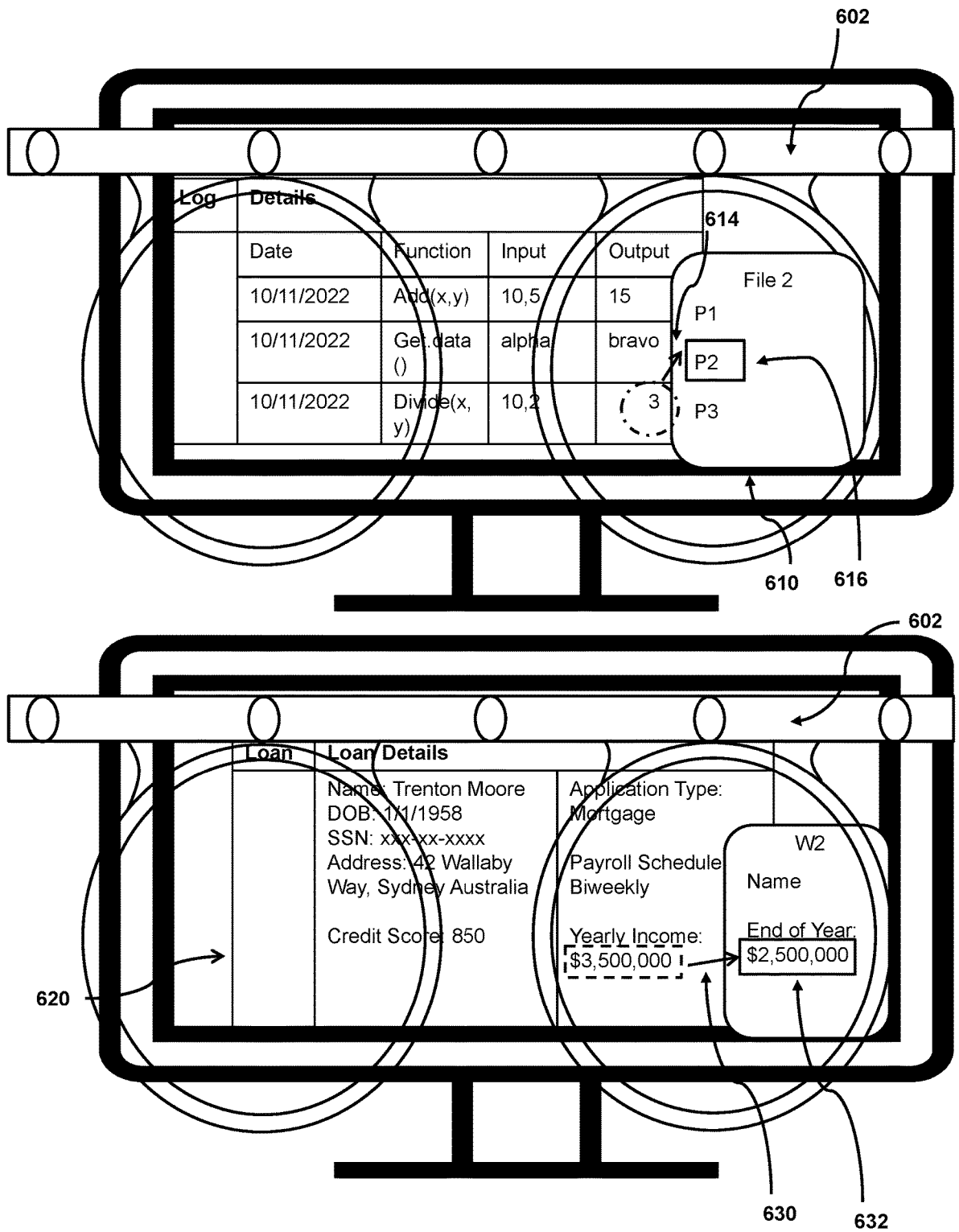

As an example, referring to FIG. 6C, a user may view one or more visual indications of the one or more other files associated with the error (or other inconsistency) via augmented reality headset 602. The augmented reality headset 602 may include one or more outward facing sensors which may be configured as one or more gesture recognition sensors (e.g., image sensors, infrared sensors, or other sensors). The augmented reality headset may determine one or more gestures of a user, such as whether the user is selecting a file. As an example, the user may point, pinch, tap, drag, interact, or enact another user gesture indicating a selection of a file. In this example, the user may interact with the file related to the error (e.g., the error associated with error indicator 606 (FIG. 6A)) by providing pointing-gesture 612. For instance, where the user is a loan underwriter viewing loan application 620, the loan underwriter may interact with expanded supporting document 626 by providing pointing-gesture 628. Referring to FIG. 6D, in some embodiments, an enlarged presentation of the selected file (e.g., the selected file corresponding to the updated-file-visual-indicator 610, the selected supporting document corresponding to the expanded supporting document 626) may be generated for display. For example, the selected file (e.g., the selected file that is related to the error) may be linked via link 614 to a highlight of a portion 616 of the selected file. As another example, the selected supporting document related to the loan application 620 may be linked to an inconsistency between the portion of the loan application indicating the error (e.g., error indicator 622) and the portion of the supporting document 632 that is inconsistent with the error via link 630.

In some embodiments, the links 614, 630 may correspond to the generated links within the data structure generated in step 504. For instance, in some embodiments, process 500 may determine the links by obtaining a data structure (e.g., as generated in step 504) and parsing through the data structure to determine which portion(s) of one file are "linked" to an error or other inconsistency between another file. Upon determining the links, process 500 may generate a visual indication of a link (e.g., link 614, link 630) to visually link the portion of the file that is associated with the error to another portion of another file that is associated with the error. By generating for display, the selected file, including links to one or more highlighted portions of the selected file (e.g., that is related to the error or other inconsistency of the file), the system may enable the user to identify errors between the file and the one or more other files related to the file (or as related to the error) which may improve the user experience. Additionally, by providing such presentation, the system may improve the user experience by providing portions of related files that are directly associated with a determined error.

In some embodiments, although not shown, multiple files may be presented to the user indicating a set of links indicating errors or other inconsistencies. For example, similar to the discussion of FIG. 6D, multiple files that are associated with the error (e.g., via a user selection of the files) may be presented that include one or more links to the error associated with the file. For example, where the file is a loan application and two other files, such as a bank statement and a W2 of an applicant are presented to the user (e.g., as being associated with an inconsistency within the loan application), process 500 may generate for display, via an augmented reality device, (i) the loan application, (ii) the bank statement and the W2 of the applicant of the loan application, and (iii) links that link one or more portions of the loan application to one or more potions of the bank statement and the W2 of the applicant. For instance, where an inconsistency has been identified (e.g., via a machine learning model) and such inconsistencies have been stored in a data structure, process 500 may obtain the data structure to identify the links. Upon identifying the links, process 500 may generate one or more visual representations of the links to be displayed within the augmented reality environment to indicate to the user (e.g., a loan underwriter) that there is an inconsistency identified between (i) the loan application (e.g., at a first portion of the loan application) and (ii) the bank statement and the W2 of the applicant (e.g., at a second portion, a third portion, etc.). In this way, the user may be notified of multiple errors or other inconsistencies that are "linked" together to enable the user to provide a further analysis of the documents.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving an image of a file being viewed by a user; determining whether the file is associated with a first error indicating an inconsistency between the file and one or more other files related to the file, wherein the inconsistency has been identified based on difference within file data of the file and the file data within the one or more other files; determining one or more file identifiers corresponding to the one or more other files; based on determining that the file is associated with the first error, retrieving, based on the one or more file identifiers corresponding to the one or more other files, the one or more other files associated with the inconsistency; and generating for display, on one or more augmented reality displays, (i) a visual indicator indicating the first error and (ii) one or more visual indications of the one or more other files associated with the inconsistency.

2. The method of any of the preceding embodiments, wherein the inconsistency has been identified using a machine learning model trained to identify inconsistencies within files.

3. The method of any of the preceding embodiments, wherein determining whether the file is associated with the first error further comprises: transmitting an instruction to a remote server to determine whether the file is associated with the first error, wherein the instruction comprises (i) a file identifier of the file, (ii) the one or more other file identifiers corresponding to the one or more other files, and (iii) an indication to provide the file and the one or more other files related to the file to the machine learning model; and receiving, from the remote server, a result indicating that the file is associated with the first error, wherein the result is based on the machine learning model identifying that at least one portion of the file is inconsistent with data within one or more respective files of the one or more other files.

4. The method of any of the preceding embodiments, further comprising: wherein in response to the result indicating that the file is associated with the first error, transmitting a second instruction to the remote server to obtain a data structure; and receiving, from the remote server, the data structure comprising (i) the at least one portion of the file and (ii) one or more other portions of respective files of the one or more other files, wherein the at least one portion of the file is linked to the one or more other portions of the respective files of the one or more other files.

5. The method of any of the preceding embodiments, further comprising: receiving the one or more other files; determining a type of file for each file of the one or more other files; determining, for a first file of a first type of the one or more other files, a plurality of portions, wherein each portion based on a datatype of each portion; determining one or more sets of files of the one or more other files related to each portion of the first file; and inputting (i) the first file, (ii) the one or more sets of files, (iii) indications of each portion, and (iv) indications of each set of files for each portion into the machine learning model, wherein the machine learning model outputs for each portion an inconsistency indicator, indicating whether there is an inconsistency between each portion and a corresponding set of files.

6. The method of any of the preceding embodiments, wherein the machine learning model is trained by: obtaining training data comprising a set of files, wherein each file of the set of files comprises (i) a respective file type identifier and (ii) one or more labels corresponding to respective inconsistencies within one or more files within the set of files as related to a subset of files within the set of files; and providing the training data to a training routine of the machine learning model to train the machine learning model.

7. The method of any of the preceding embodiments, further comprising: monitoring one or more eyes of the user using one or more eye-tracking sensors; determining, based on the monitoring, that the user is fixating on a first portion of the file, wherein the first portion of the file is associated with the first error; generating for display, on the one or more augmented reality displays, (i) the visual indicator indicating the first error such that the visual indicator is presented to indicate the first portion of the file and (ii) one or more selectable visual indications of the one or more other files associated with the inconsistency such that the one or more other files are presented to indicate the first portion of the file; determining, based on a second monitoring of the one or more eyes of the user using the one or more eye-tracking sensors, whether the user is fixating on a first visual indication of the one or more selectable visual indications of the one or more other files; determining a time period indicating an amount of time that the user is fixating on the first visual indication; comparing the time period to a threshold time period to determine whether the time period satisfies the threshold time period; and in response to the time period satisfying the threshold time period, generating for display, on the one or more augmented reality displays, an updated visual indication for each of the one or more selectable visual indications of the one or more other files associated with the inconsistency, wherein the updated visual indication for each of the one or more selectable visual indications enlarges a respective visual indication to enable a selection of one of the other files.

8. The method of any of the preceding embodiments, further comprising: determining, based on gesture recognition, a user selection of a first updated visual indication of the one or more selectable visual indications of the one or more other files associated with the inconsistency; and in response to the user selection, generating for display, a selected file corresponding to the first updated visual indication with an image of the selected file, wherein the selected file is linked to a highlight of a portion of the selected file.

9. The method of any of the preceding embodiments, further comprising: transmitting an instruction to a remote server to determine whether the file is associated with the first error, wherein the instruction comprises (i) a file identifier of the file, (ii) one or more other file identifiers corresponding to the one or more other files related to the file, and (iii) an indication to provide the file and the one or more other files related to the file to the machine learning model; receiving, from the remote server, one or more outputs from the machine learning model indicating a plurality of errors, wherein each error of the plurality of errors indicate (i) an inconsistency between the file and a respective file of the one or more other files and (ii) the file identifier of the respective file of the one or more other files; and generating a data structure, based on the plurality of errors, wherein the data structure associates each inconsistency between the file and the respective file of the one or more other files using a file identifier associated with the file and the one or more file identifiers corresponding to the one or more other files.

10. A non-transitory, computer-readable medium storing instructions that, when executed by a data processing apparatus, cause the data processing apparatus to perform operations comprising those of any of embodiments 1-9.

11. A system comprising one or more processors; and memory storing instructions that, when executed by the processors, cause the processors to effectuate operations comprising those of any of embodiments 1-9.

12. A system comprising means for performing any of embodiments 1-9.

What is claimed is:

1. A system for displaying visual indications of one or more files that are associated with one or more portions of a file being viewed via an augmented reality headset, the system comprising:
one or more image sensors;
one or more eye-tracking sensors;
one or more augmented reality displays; and
one or more processors for executing computer program instructions that, when executed, cause the one or more processors to perform operations comprising:
receiving, from the one or more image sensors, an image of a document being viewed by a user;
identifying, from the image, that the file corresponds to the document and a file package related to the file;
detecting, using the one or more eye-tracking sensors, that the user is fixating on a first portion of the document;
transmitting an instruction to a remote server to determine whether the first portion of the document is associated with a first error flag indicating an inconsistency between the file and one or more other files, of the one or more files, within the file package, wherein the instruction comprises a file identifier of the file and a package identifier of the file package;
receiving, from the remote server, a result indicating that the first portion of the document is associated with the first error flag, wherein the result is based on a machine learning model identifying that the first portion of the file is inconsistent with one or more other portions of respective files of the file package;
determining one or more file identifiers corresponding to the one or more other files;
retrieving, based on determining that the first portion of the file is associated with the first error flag and based on the one or more file identifiers corresponding to the one or more other files, the one or more other files within the file package related to the inconsistency; and
generating, on the one or more augmented reality displays, (i) an overlay over the first portion of the file highlighting the first portion of the file and (ii) the one or more files associated with the inconsistency presented proximate to the overlay.

2. The system of claim 1, wherein the instruction further comprises an indication to provide the file and the file package to the machine learning model.

3. The system of claim 1, wherein the operations further comprise:
in response to the result indicating that the first portion of the document is associated with the first error flag, transmitting a second instruction to the remote server to obtain a graph data structure; and
receiving, from the remote server, the graph data structure comprising one or more nodes and one or more edges, wherein (i) the one or more nodes comprise the first portion of the file and the one or more other portions of the respective files of the file package that are inconsistent with information associated with the first portion of the file and (ii) the one or more edges represent links between the first portion of the file and the one or more other portions of the respective files of the file package that are inconsistent with the information associated with the first portion of the file.

4. The system of claim 1, further comprising:
receiving the file package;
determining types of files within the file package;
determining, for a first type of the types of files, a plurality of file portions;
determining one or more sets of files within the file package related to each file portion; and
causing input of indications of each portion and indications of each set of files for each file portion into the machine learning model, wherein the machine learning model outputs, for each portion an inconsistency indicator, indicating whether there is an inconsistency between each portion and a corresponding set of files of the one or more sets of files.

5. A method for displaying visual indications of one or more files that are associated with a file being viewed via an augmented reality headset, the method comprising:
receiving an image of the file while the file is being viewed by a user via the augmented reality headset;
determining whether the file is associated with a first error indicating an inconsistency between the file and one or more other files, of the one or more files, related to the file, wherein the inconsistency has been identified using a machine learning model trained to identify inconsistencies within files;
determining one or more file identifiers corresponding to the one or more other files;
based on determining that the file is associated with the first error, retrieving, based on the one or more file identifiers corresponding to the one or more other files, the one or more other files associated with the inconsistency;
monitoring one or more eyes of the user using one or more eye-tracking sensors;
determining, based on the monitoring, that the user is fixating on a first portion of the file, wherein the first portion of the file is associated with the first error;
generating for display, on one or more augmented reality displays, (i) a visual indicator indicating the first error such that the visual indicator is presented to indicate the first portion of the file and (ii) one or more selectable visual indications of the one or more other files associated with the inconsistency such that the one or more other files are presented to indicate the first portion of the file;
determining, based on a second monitoring of the one or more eyes of the user using the one or more eye-tracking sensors, that the user is fixating on a first visual indication of the one or more selectable visual indications of the one or more other files;
determining a time period indicating an amount of time that the user is fixating on the first visual indication of the one or more selectable visual indications of the one or more other files;
determining that the time period satisfies a threshold time period; and
generating for display, based on determining that the time period satisfies the threshold time period and on the one or more augmented reality displays, an updated visual indication for the first visual indication, wherein the updated visual indication enlarges the first visual indication to enable selection of one of the one or more other files.

6. The method of claim 5, wherein determining whether the file is associated with the first error further comprises:
transmitting an instruction to a remote server to determine whether the file is associated with the first error, wherein the instruction comprises (i) a file identifier of the file, (ii) the one or more other file identifiers corresponding to the one or more other files, and (iii) an indication to provide the file and the one or more other files related to the file to the machine learning model; and
receiving, from the remote server, a result indicating that the file is associated with the first error, wherein the result is based on the machine learning model identifying that at least one portion of the file is inconsistent with data within one or more respective files of the one or more other files.

7. The method of claim 6, further comprising:
in response to the result indicating that the file is associated with the first error, transmitting a second instruction to the remote server to obtain a data structure; and
receiving, from the remote server, the data structure comprising (i) the at least one portion of the file and (ii) one or more other portions of respective files of the one or more other files, wherein the at least one portion of the file is linked to the one or more other portions of the respective files of the one or more other files.

8. The method of claim 5, further comprising:
receiving the one or more other files;
determining a type of file for each file of the one or more other files;
determining, for a first file of a first type of the one or more other files, a plurality of portions, wherein each portion based on a datatype of each portion;
determining one or more sets of files of the one or more other files related to each portion of the first file; and
inputting (i) the first file, (ii) the one or more sets of files, (iii) indications of each portion, and (iv) indications of each set of files for each portion into the machine learning model, wherein the machine learning model outputs for each portion an inconsistency indicator, indicating whether there is an inconsistency between each portion and a corresponding set of files.

9. The method of claim 5, wherein the machine learning model is trained by:
obtaining training data comprising a set of files, wherein each file of the set of files comprises (i) a respective file type identifier and (ii) one or more labels corresponding to respective inconsistencies within one or more files within the set of files as related to a subset of files within the set of files; and
providing the training data to a training routine of the machine learning model to train the machine learning model.

10. The method of claim 5, further comprising:
generating for display, on the one or more augmented reality displays, another updated visual indication for a second visual indication of the one or more selectable visual indications of the one or more other files associated with the inconsistency.

11. The method of claim 10, further comprising:
determining, based on gesture recognition, a user selection of the updated visual indication; and
based on the user selection, generating for display, an image of the one of the one or more other files, wherein the one of the one or more other files is linked to a highlight of a portion of the one of the one or more other files.

12. The method of claim 5, further comprising:
transmitting an instruction to a remote server to determine whether the file is associated with the first error, wherein the instruction comprises (i) a file identifier of the file, (ii) one or more other file identifiers corresponding to the one or more other files related to the file, and (iii) an indication to provide the file and the one or more other files related to the file to the machine learning model;

receiving, from the remote server, one or more outputs from the machine learning model indicating a plurality of errors, wherein each error of the plurality of errors indicate (i) an inconsistency between the file and a respective file of the one or more other files and (ii) the file identifier of the respective file of the one or more other files; and generating a data structure based on the plurality of errors, wherein the data structure associates each inconsistency between the file and the respective file of the one or more other files using the file identifier of the file and the one or more file identifiers corresponding to the one or more other files.

13. One or more non-transitory computer-readable media comprising instructions that, when executed by one or more processors, cause operations comprising:

receiving an image of a file being viewed by a user via an augmented reality headset;

determining whether the file is associated with a first error indicating an inconsistency between the file and one or more other files related to the file, wherein the inconsistency has been identified based on difference within file data of the file and the file data within the one or more other files;

determining one or more file identifiers corresponding to the one or more other files;

based on determining that the file is associated with the first error, retrieving, based on the one or more file identifiers corresponding to the one or more other files, the one or more other files associated with the inconsistency;

monitoring one or more eyes of the user using one or more eye-tracking sensors;

determining, based on the monitoring, a selection of a first portion of the file, wherein the first portion of the file is associated with the first error;

generating for display, on one or more augmented reality displays, (i) a visual indicator indicating the first error such that the visual indicator is presented to indicate the first portion of the file and (ii) one or more selectable visual indications of the one or more other files associated with the inconsistency such that the one or more other files are presented to indicate the first portion of the file;

determining, based on a second monitoring of the one or more eyes of the user using the one or more eye-tracking sensors, that the user is viewing a first visual indication of the one or more selectable visual indications of the one or more other files;

generating for display, based on the user viewing the first visual indication, an updated visual indication for the first visual indication, wherein the updated visual indication enlarges the first visual indication to enable selection of one of the one or more other files.

14. The one or more non-transitory computer-readable media of claim 13, wherein determining whether the file is associated with the first error further comprises:

transmitting an instruction to a remote server to determine whether the file is associated with the first error, wherein the instruction comprises (i) a file identifier of the file, (ii) one or more other file identifiers corresponding to the one or more other files related to the file, and (iii) an indication to provide the file and the one or more other files related to the file to a machine learning model; and receiving, from the remote server, a result indicating that the file is associated with the first error, wherein the result is based on the machine learning model identifying that at least one portion of the file is inconsistent with data within one or more respective files of the one or more other files.

15. The one or more non-transitory computer-readable media of claim 14, wherein the operations further comprise:

in response to the result indicating that the file is associated with the first error, transmitting a second instruction to the remote server to obtain a data structure; and receiving, from the remote server, the data structure comprising (i) the at least one portion of the file and (ii) one or more other portions of the respective files of the one or more other files, wherein the at least one portion of the file is linked to the one or more other portions of the respective files of the one or more other files.

16. The one or more non-transitory computer-readable media of claim 13, wherein the operations further comprise:

receiving the one or more other files;

determining a type of file for each file of the one or more other files;

determining, for a first file of a first type of the one or more other files, a plurality of portions, wherein each portion is based on a datatype of each portion;

determining one or more sets of files of the one or more other files related to each portion of the first file; and inputting (i) the first file, (ii) the one or more sets of files, (iii) indications of each portion, and (iv) indications of each set of files for each portion into a machine learning model, wherein the machine learning model outputs for each portion an inconsistency indicator, indicating whether there is an inconsistency between each portion and a corresponding set of files.

17. The one or more non-transitory computer-readable media of claim 13, wherein the operations further comprise:

obtaining training data comprising a set of files, wherein each file of the set of files comprises (i) a respective file type identifier and (ii) one or more labels corresponding to respective inconsistencies within one or more files within the set of files as related to a subset of files within the set of files; and providing the training data to a training routine of a machine learning model to train the machine learning model.

18. The one or more non-transitory computer-readable media of claim 13, wherein the operations further comprise:

determining a time period indicating an amount of time that the user is viewing the first visual indication; and comparing the time period to a threshold time period to determine whether the time period satisfies the threshold time period, wherein the updated visual indication is generated based on the time period satisfying the threshold time period.

19. The one or more non-transitory computer-readable media of claim 18, wherein the operations further comprise:

determining, based on gesture recognition, a user selection of the updated visual indication; and based on the user selection, generating for display, an image of the one of the one or more other files.

20. The one or more non-transitory computer-readable media of claim 13, wherein the operations further comprise:

transmitting an instruction to a remote server to determine whether the file is associated with the first error, wherein the instruction comprises (i) a file identifier of the file, (ii) one or more other file identifiers corresponding to the one or more other files, and (iii) an indication to provide the file and the one or more other files related to the file to a machine learning model;

receiving, from the remote server, one or more outputs from the machine learning model indicating a plurality of errors, wherein each error of the plurality of errors indicate (i) an inconsistency between the file and a respective file of the one or more other files and (ii) the file identifier of the respective file of the one or more other files; and generating a data structure based on the plurality of errors, wherein the data structure associates each inconsistency between the file and the respective file of the one or more other files using the file identifier of the file and the one or more file identifiers corresponding to the one or more other files.

\* \* \* \* \*